United States Patent
Akahori

(10) Patent No.: US 7,684,311 B2
(45) Date of Patent: Mar. 23, 2010

(54) EQUALIZER AND EQUALIZATION METHOD

(75) Inventor: Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 751 days.

(21) Appl. No.: 11/513,227

(22) Filed: Aug. 31, 2006

(65) Prior Publication Data
US 2007/0064786 A1    Mar. 22, 2007

(30) Foreign Application Priority Data

Sep. 5, 2005    (JP)    ............................. 2005-256588
Mar. 31, 2006    (JP)    ............................. 2006-097537

(51) Int. Cl.
*H04J 11/00* (2006.01)
(52) U.S. Cl. .................. 370/208; 370/319; 370/344; 375/260; 455/59
(58) Field of Classification Search ......... 370/208–210, 370/319, 344; 708/203; 376/260; 455/59; 375/260
See application file for complete search history.

(56) References Cited

U.S. PATENT DOCUMENTS

2005/0174931 A1* 8/2005 Krishnamoorthi .......... 370/208
2005/0180461 A1* 8/2005 Kao et al. ................... 370/480
2006/0031735 A1* 2/2006 Tsuchie ....................... 714/752
2006/0166634 A1* 7/2006 Ido ........................... 455/277.1
2008/0063040 A1* 3/2008 Akahori ....................... 375/232

FOREIGN PATENT DOCUMENTS

| JP | 2000-022661 | 1/2000 |
| JP | 2004-153811 | 5/2004 |
| JP | 2005-045664 | 2/2005 |

OTHER PUBLICATIONS

U.S. Appl. No. 12/238,746, filed Sep. 2006, Akahori, Hiroji.*

* cited by examiner

*Primary Examiner*—Ian N Moore
(74) *Attorney, Agent, or Firm*—Studebaker & Brackett PC; Donald R. Studebaker

(57) ABSTRACT

There is provided an equalizer that includes: a first extracting circuit extracting a plurality of pilot symbols from an inputted signal; an inverse Fourier transform circuit inversely Fourier transforming the extracted plurality of pilot symbols, and computing a complex gain per path; a second extracting circuit extracting a plurality of paths by using the complex gains; a Fourier transform circuit Fourier transforming the extracted paths; and an equalization computing circuit extracting phase components of the Fourier-transformed paths, and carrying out multiplication by using the inputted signal and the extracted phase components.

13 Claims, 16 Drawing Sheets

EQUALIZER AND EQUALIZATION METHOD

CROSS REFERENCE TO RELATED APPLICATION

This application claims priority under 35 USC 119 from Japanese Patent Application Nos. 2005-256588 and 2006-097537, the disclosures of which are incorporated by reference herein.

BACKGROUND OF THE INVENTION

1. Field of the Invention

The present invention relates to the demodulating of OFDM (Orthogonal Frequency Division Multiplexing) digitally modulated signals, and in particular, relates to an equalizer and an equalization method using pilot symbols.

2. Description of the Related Art

Terrestrial Integrated Services Digital Broadcasting (ISDB-T) employs OFDM digital modulation which is strong against multipath interference. In demodulating a signal which has been modulated by OFDM modulation (hereinafter, "OFDM signal"), a scattered pilot method which disperses pilot symbols in the frequency direction and the time direction is used as the amplitude phase standard for demodulation.

Japanese Patent Application Laid-Open (JP-A) No. 2000-22661 discloses an OFDM demodulator, and in particular, an automatic equalizer which carries out inverse Fourier transformation for equalization processing which removes distortion of the propagation path. A conventional OFDM demodulator receives a signal having a frame structure formed from frame symbols, a pattern signal for propagation path estimation which is continuous with the frame symbols, and data symbols which are continuous with the pattern signal for propagation path estimation. The conventional OFDM demodulator estimates a transfer function by using the pattern signal for propagation path estimation, and carries out equalization of the data symbols by using the estimated transfer function.

However, because the OFDM demodulator of JP-A No. 2000-22661 presupposes reception of a signal having the above-described frame structure, the OFDM demodulator has the problem that it cannot demodulate a signal of a data structure in which pilot symbols are scattered among data symbols such as used in Terrestrial Integrated Services Digital Broadcasting.

Further, an IFFF circuit 5-1 of an OFDM signal receiver of JP-A No. 2005-45664 inverse fast Fourier transforms scattered pilot signals of the past four symbols including the latest one symbol (paragraph [0015]). However, in the OFDM signal receiver of JP-A No. 2005-45664, the signal after the inverse fast Fourier transform is merely passed through an LPF, and the noise component included in the region of passage at the LPF cannot be removed in advance. Therefore, the OFDM signal receiver of JP-A No. 2005-45664 has the problem that, as the noise included in the received signal increases, the error in the results of estimating the transfer path becomes greater and the receiving characteristic deteriorates.

Further, an OFDM signal equalizer of JP-A No. 2004-153811 discloses a 4-symbol delay section (see FIG. 5). However, JP-A No. 2004-153811 does not utilize inverse Fourier transformation, but relatively compares the pilot symbols of the same sub-carrier existing four symbols before. Therefore, changes in the transfer function of the transfer path cannot be known until the pilot symbols of the same sub-carrier appearing four symbols after emerge. There is the problem that, if the transfer function of the transfer path changes within four symbols, it is easy for a case to arise in which equalization cannot be carried out correctly.

SUMMARY OF THE INVENTION

Thus, an object of the present invention is to provide an equalizer and an equalization method which demodulate a signal of a data structure in which pilot symbols are scattered among data symbols.

An equalizer of an aspect of the present invention includes: a first extracting circuit extracting a plurality of pilot symbols from an inputted signal; an inverse Fourier transform circuit inversely Fourier transforming the extracted plurality of pilot symbols, and computing a complex gain per path; a second extracting circuit extracting a plurality of paths by using the complex gains; a Fourier transform circuit Fourier transforming the extracted paths; and an equalization computing circuit extracting phase components of the Fourier-transformed paths, and equalizing the inputted signal by using the extracted phase components.

Further, an equalization method of another aspect of the present invention includes: extracting a plurality of pilot symbols from an inputted signal; inversely Fourier transforming the extracted plurality of pilot symbols, and computing a complex gain per path; extracting a plurality of paths by using the complex gains; Fourier transforming the extracted paths; extracting phase components of the Fourier-transformed paths; and equalizing the inputted signal by using the extracted phase components.

In accordance with the equalizer and equalization method of the present invention, a signal of a data structure in which pilot symbols are scattered among data symbols can be demodulated.

BRIEF DESCRIPTION OF THE DRAWINGS

Exemplary embodiments of the present invention will be described in detail based on the following figures, wherein.

DETAILED DESCRIPTION OF THE INVENTION

Figure 1:
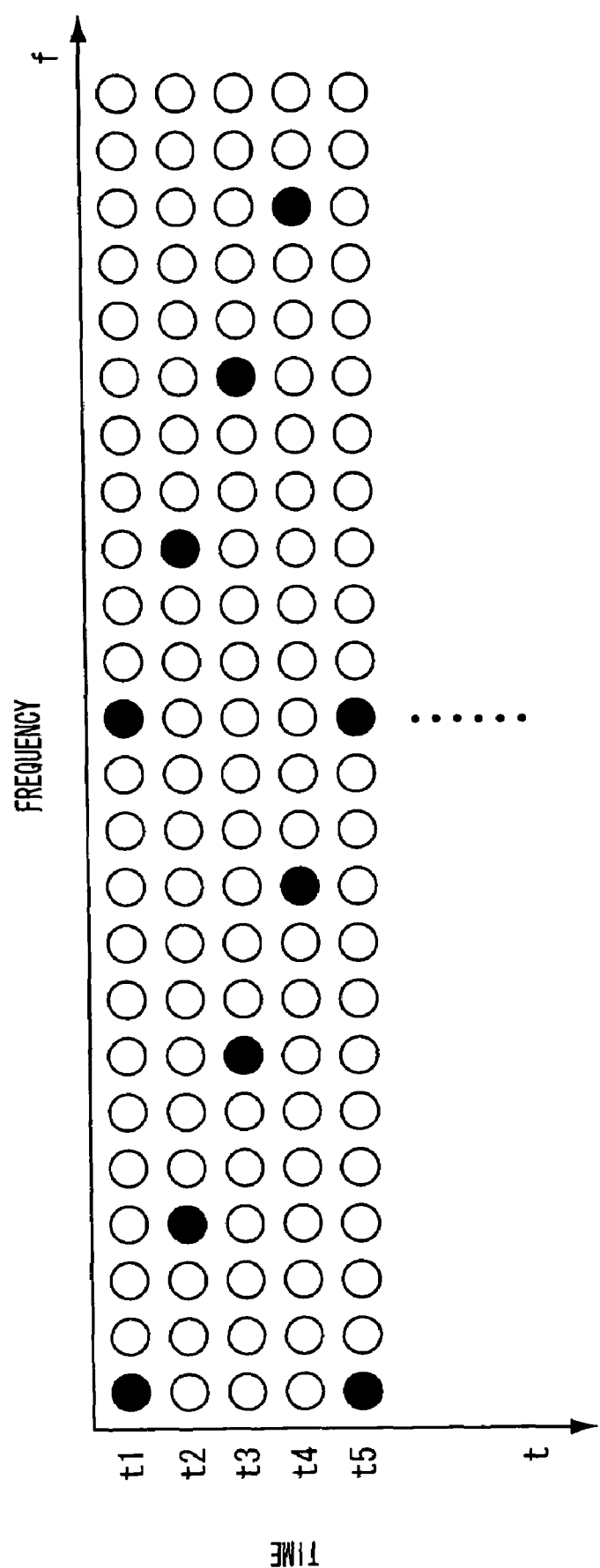
FIG. 1 is graph showing the arrangement relationship of pilot symbols and data symbols.

First, by using FIG. 1, description will be given of a frame structure showing the arrangement relationship of pilot symbols and data symbols in the scattered pilot method used in the present invention. Time (OFDM symbols) is shown on the vertical axis in FIG. 1, and frequency is shown on the horizontal axis. The black circles in FIG. 1 represent pilot symbols, and the white circles represent data symbols. In this example, the same symbol arrangement appears in one period of four OFDM symbols. However, the present invention is of course not limited to this period.

The equalizer and equalization method of the present invention will be described hereinafter by using the drawings.

First Exemplary Embodiment

An equalizer and equalization method of a first exemplary embodiment will be described hereinafter. To summarize the equalizer and equalization method of the first exemplary embodiment by using FIG. 1, the current (e.g., t3) OFDM symbol is demodulated by using the pilot symbols of the current OFDM symbol in the equalizer and equalization method of the first exemplary embodiment.

Figure 2:
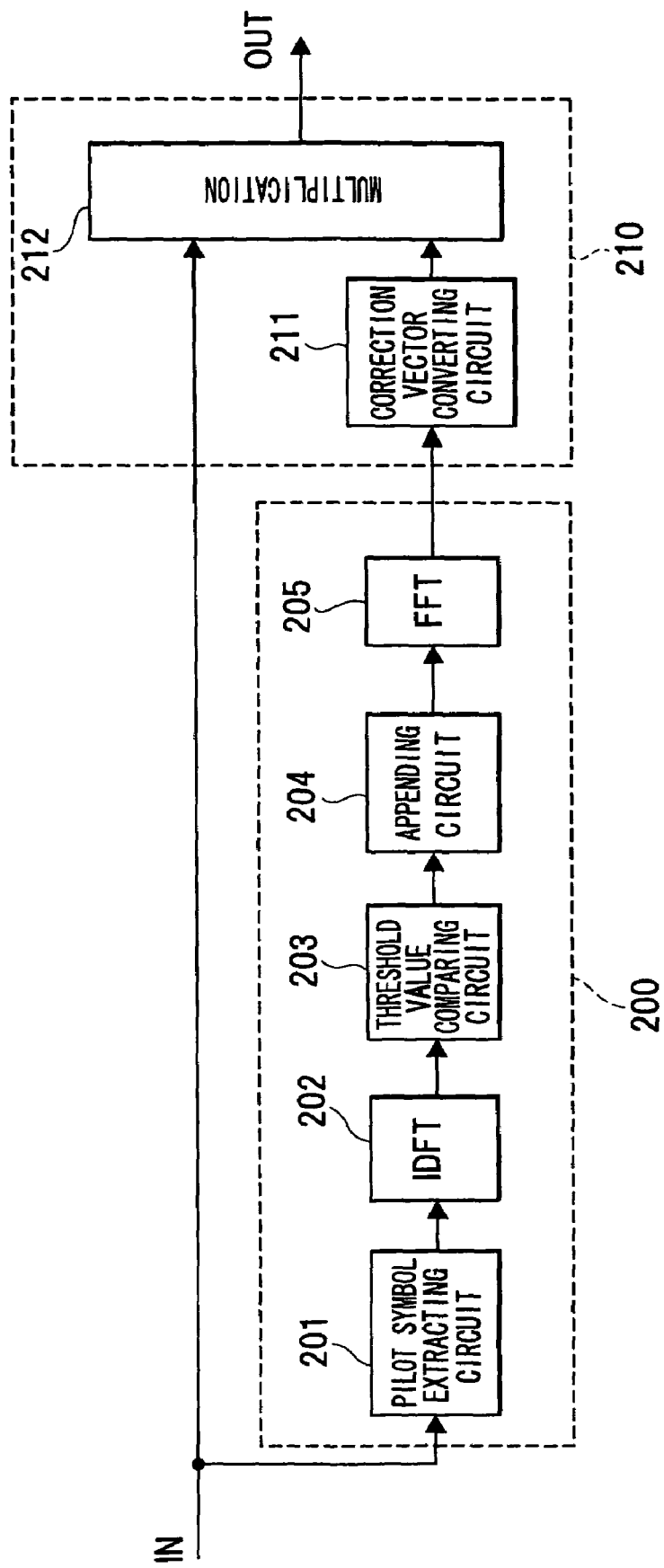
FIG. 2 is a block diagram showing an equalizer of the present invention.

FIG. 2 is a block diagram showing the structure of the equalizer of the present invention. The equalizer of the present invention is structured from a channel estimating section 200 and an equalization computing section 210, to which a Fourier-transformed inputted signal IN is inputted. Here, the inputted signal is a signal which is Fourier-transformed in units of one OFDM symbol.

The channel estimating section 200 is structured from a pilot symbol extracting circuit 201, an inverse discrete Fourier transform circuit (IDFT) 202, a threshold value comparing circuit 203, an appending circuit 204, and a fast Fourier transform circuit (FFT) 205.

The pilot symbol extracting circuit 201 extracts the pilot symbols from the inputted signal in which pilot symbols and data symbols are mixed together. The pilot symbols are scattered in the inputted signal at a predetermined period. The pilot symbol extracting circuit 201 extracts the pilot symbols by using this period which is obtained from the exterior. Here, explanation will be given by using a concrete image of extraction. For simplicity, the pilot symbols are P and the data symbols are D. Assuming, for example, that the data array of the inputted signal is DDDPDDDPDDDPDDD, the image of the extraction is the replacing of D by 0 (zero). In this case, the data array of the signal after extraction is 000P000P000P000.

Figure 3:
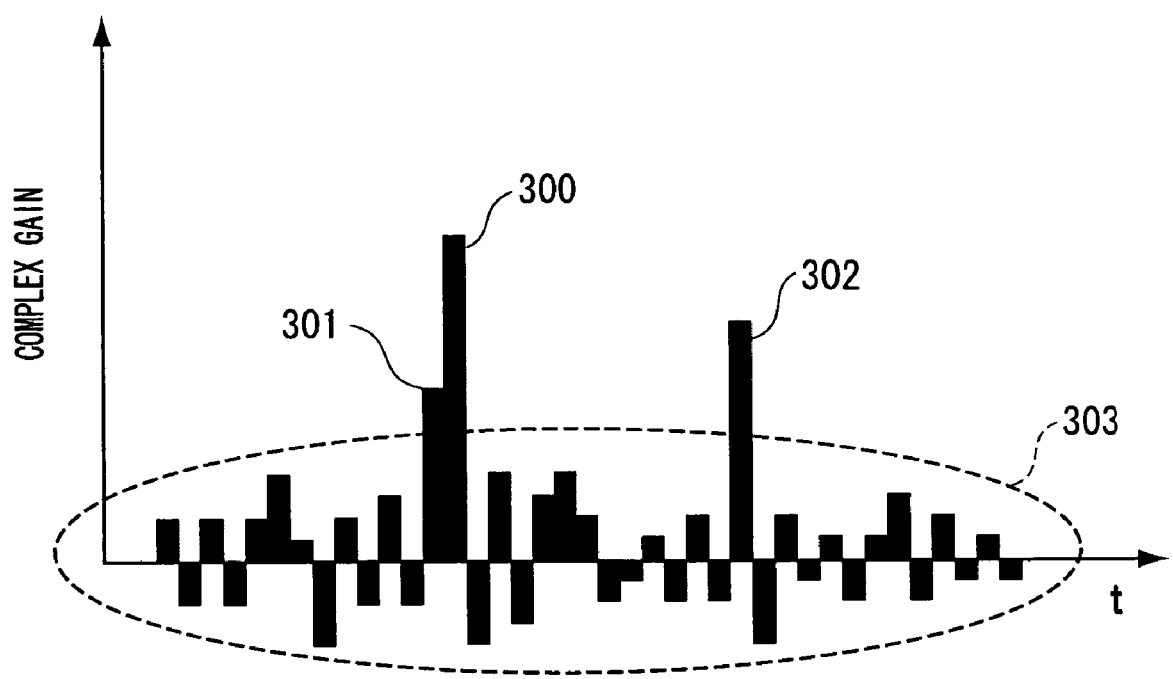
FIG. 3 is a graph showing a complex gain of each path after inverse discrete Fourier transformation.

The inverse discrete Fourier transform circuit 202 is connected to the pilot symbol extracting circuit 201, and carries out inverse discrete Fourier transformation having a delay time width which can be estimated, and determines the complex gain for each arrival path. Note that the complex gain includes not just the transfer function of the transfer path by the delay path, and noise and computational errors are included. Here, FIG. 3 is a graph showing the complex gain for each arrival path which is obtained by the inverse discrete Fourier transformation. Path 300, which shows the largest complex gain in FIG. 3, is estimated to be a signal which has directly arrived to the receiver from the transmitter of the OFDM signal. On the other hand, paths 301 and 302 can be estimated to be signals which have detoured rather than arriving directly because, between the transmitter and receiver of the OFDM signal, the OFDM signal is reflected due to obstacles such as buildings or the like. Further, paths 303 are estimated to be signals which arise due to noise or computational errors or the like. Note that the inverse discrete Fourier transform circuit 202 carries out transformation by using the following formula. Here, the sine wave coefficient $e^{-j\square}$ used in the inverse discrete Fourier transformation differs in accordance with the position where the pilot symbol is inserted, and therefore, the sine wave coefficient must be made to be able to be varied for each OFDM symbol.

$$SP\_res(t, l) = \sum_{k=0}^{sp\_num} SP\_sc(t, k)e^{j2\pi[fsp1(t)+stp\times k]\times \frac{l}{fft\_num}} \quad \text{[Formula 1]}$$

Here, t is the OFDM symbol time, l is the delay time, k is the pilot symbol number, SP_res(t,l) is the complex gain, SP_sc(t,l) is the transfer function and the noise superimposed on the pilot symbol, fsp1(t) is the sub-carrier position with respect to the pilot symbol of the lowest frequency, stp is the sub-carrier frequency interval of the pilot symbols, sp_num is the number of pilot symbols used in transfer path estimation, and fft_num is the number of points of the Fourier transformation. Note that, in the present exemplary embodiment, description is given of a case using an inverse discrete Fourier transformation circuit, but an inverse fast Fourier transformation circuit may of course be used.

Figure 4:
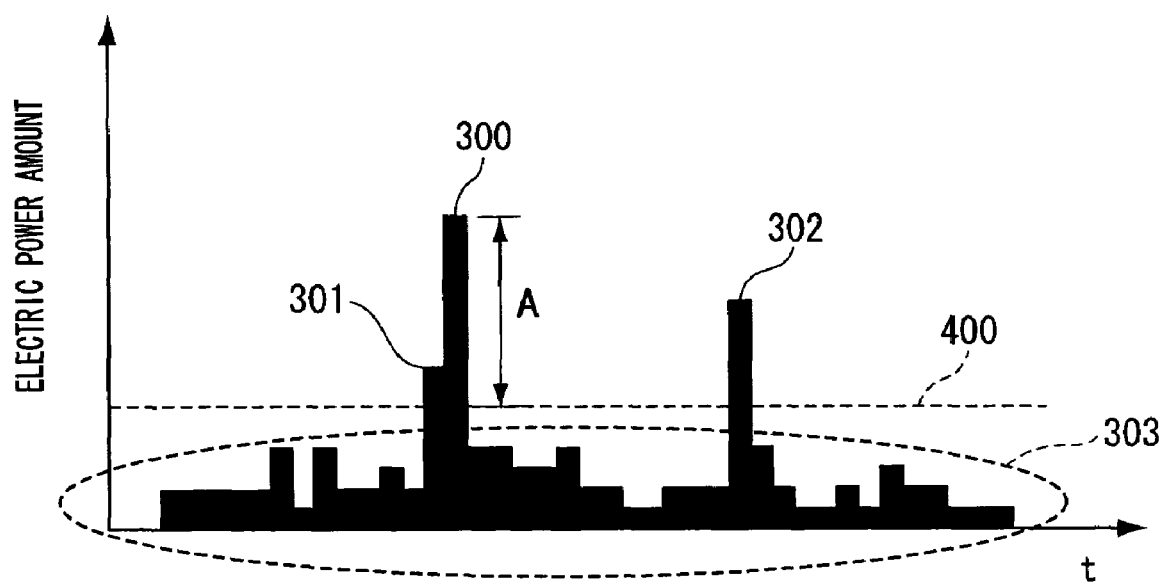
FIG. 4 is a graph showing the complex gain of each path as an electric power amount.
Figure 5:
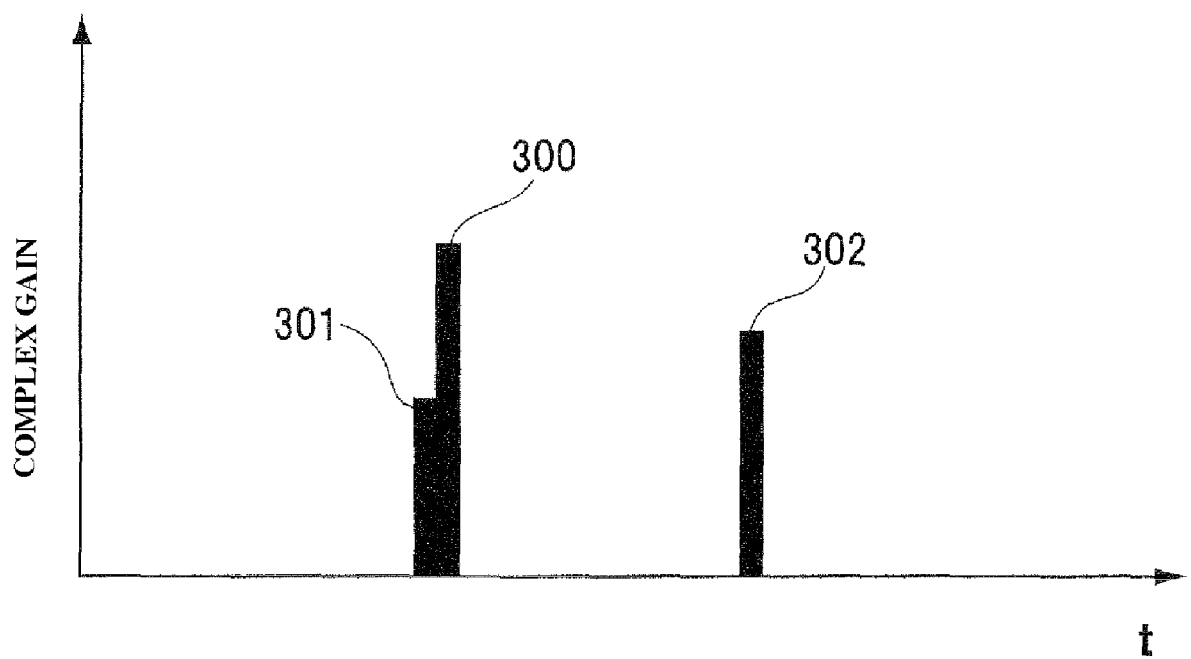
FIG. 5 is a graph showing the complex gains of extracted paths.

Next, the threshold value comparing circuit 203 will be described by using FIGS. 4 and 5. FIG. 4 is a graph showing the amount of electric power per arrival path which is computed from the complex gain. FIG. 5 is a graph showing the complex gains of extracted paths. Here, in an OFDM symbol having pilot symbols which are arranged at uniform sub-carrier intervals, the delay time width of the complex gain which can be estimated theoretically is the delay time width to the reciprocal of the sub-carrier interval of the pilot symbols, with respect to the effective OFDM symbol length. For example, in Terrestrial Integrated Services Digital Broadcasting, one pilot symbol is disposed at 12 sub-carriers. Accordingly, the delay time of the complex gain which can be estimated theoretically is 1/12 of the effective OFDM symbol length. Namely, at the threshold value comparing circuit 203, the complex gain which is compared is 1/12 of the entire complex gain obtained by the inverse discrete Fourier transformation.

First, the threshold value comparing circuit 203 determines the electric power for each path from the complex gain obtained by the inverse discrete Fourier transformation. Next, the threshold value comparing circuit 203 extracts the path 300 having the largest electric power among the determined electric powers. Then the threshold value comparing circuit 203 sets a relative threshold value 400 from this maximum electric power, and extracts the paths 300 through 302 which have electric powers which are greater than or equal to the threshold value 400. For example, paths existing within a predetermined electric power amount δ from the maximum electric power are determined. Then, the threshold value comparing circuit 203 outputs, as is, the complex gains of the extracted paths, and outputs "0 (zero)" for the paths which were not extracted. Here, the threshold value comparing circuit 203 extracts paths by using the following formula.

$$SP\_ph(t, 1) = \begin{cases} SP\_res(t, 1) & SP\_res(t, 1)^2 \geq \alpha SP\_res(t, 1\max)^2 \\ 0 & SP\_res(t, 1)^2 < \alpha \times SP\_res(t, 1\max)^2 \end{cases} \quad \text{[Formula 2]}$$

Here, t is the OFDM symbol time, l is the delay time, lmax is the delay time of the complex gain which becomes the largest electric power, SP_ph(t) is the threshold value comparison output, SP_res(t,l) is the complex gain, and $\alpha$ is the threshold value computing coefficient and l>$\alpha$.

The appending circuit 204 is connected to the threshold value comparing circuit 203, and appends a predetermined number of "0 (zero)" to the output of the threshold value comparing circuit 203, and outputs it. As mentioned previously, the delay time width of the complex gain which can be theoretically estimated is the delay time width until the reciprocal of the sub-carrier interval of the pilot symbols with respect to the effective OFDM symbol length. The complex gain, at which noise and computational errors have been mitigated at the threshold value comparing circuit 203, only has this delay time width. Values with respect to all of the number of points of the Fourier transformation must be included in order to carry out transfer path estimation for all of the sub-carriers in the Fourier transformation. Thus, here, "0" must be appended to the time region at or after the delay time width obtained by the threshold value comparison. In other words, if a value having electric power is appended to the time region at or after the delay time width obtained by the threshold value comparing circuit 203, an arrival path exists at the delay time corresponding to the time position where the value is appended. Because appending "0" means that there is no arrival path at that delay time, it is important to append "0" here.

The equalization computing section 210 is structured by a correction vector converting circuit 211 and a multiplication circuit 212.

The correction vector converting circuit 211 extracts the phase component of the transfer path estimation corresponding to each sub-carrier. Because the values of the transfer path estimation have real numbers and imaginary numbers, the phase component is generated by computation using a real number and an imaginary number. Then, it is converted into a value which becomes the complex conjugate of the phase component, and is outputted. Namely, real numbers are outputted as is, whereas imaginary numbers are outputted with the polarity thereof reversed. Note that the correction vector converting circuit 211 carries out conversion by using the following formula.

$$\cos\left(\tan^{-1}\left(\frac{\text{Im}}{\text{Re}}\right)\right) - j\sin\left(\tan^{-1}\left(\frac{\text{Im}}{\text{Re}}\right)\right) \quad \text{[Formula 3]}$$

The multiplication circuit 212 multiplies the value of each sub-carrier obtained by fast Fourier transforming the received OFDM signal, and the output of the correction vector converting circuit 211, by the complex. In this way, the phase rotation received at the transfer path is eliminated, and demodulated data OUT is outputted.

As described above, in accordance with the equalizer and the equalization method of the first exemplary embodiment, a threshold value is provided, and complex attenuations having small electric power such as noise or computational errors are eliminated. Accordingly, with the equalizer and the equalization method of the first exemplary embodiment, the transfer path estimation error is small, and the reception characteristic with respect to noise is good.

Further, in accordance with the equalizer and the equalization method of the first exemplary embodiment, complex attenuations which are needed in order to estimate the transfer path can be correctly taken-out by computation of a single time without repeating computation processing such as is the case with a conventional OFDM demodulator. Moreover, because there is no need to set a number of repetitions in advance, even in cases in which there is a delay time position which becomes a complex attenuation having a large electric power which is greater than or equal to the number of times of repetition (in a reception environment in which there is a very large number of delay paths), the complex attenuation of a delay time position which is needed for accurate transfer path estimation is not missed. In a reception environment in which there is a very large number of delay paths, it is easier to obtain a good reception characteristic than with a conventional method which directly estimates the complex attenuation and the delay time of the transfer path.

In addition, in accordance with the equalizer and the equalization method of the first exemplary embodiment, because transfer path estimation is carried out at one OFDM symbol, the equalizer and the equalization method of the first exemplary embodiment can follow along even in cases in which the transfer path characteristic differs per OFDM symbol, such as fast phasing or the like, and the reception characteristic with respect to the phasing is good.

Second Exemplary Embodiment

In an equalizer and equalization method of a second exemplary embodiment, the path extracting method is different than in the first exemplary embodiment. At the threshold value comparing circuit of the first exemplary embodiment, a path is extracted by using the electric power amount which is determined by squaring the complex gain. On the other hand, at the threshold value comparing circuit of the second exemplary embodiment, a path is extracted by using the absolute values of the real number and the imaginary number of the complex gain.

Concretely, the threshold value comparing circuit of the second exemplary embodiment determines the absolute values of the real number and the imaginary number of the complex gain of each path obtained at the inverse discrete Fourier transform circuit 202, and adds the absolute values of the real number and the imaginary number for each path. The threshold value comparing circuit extracts the path having the complex gain at which the results of addition are the greatest. Then, the threshold value comparing circuit sets a relative threshold value from the maximum results of addition, and extracts the paths having results of addition which are greater than or equal to the threshold value. For example, paths existing with a predetermined value from the maximum results of addition are determined. Then, the threshold value comparing circuit outputs, as is, the complex gains of the extracted paths, and outputs "0 (zero)" for the paths which were not extracted. Here, the threshold value comparing circuit extracts paths by using the following formula.

$$SP\_ph(t, 1) = \begin{cases} SP\_res(t, 1) & \text{Re}\{SP\_res(t, 1)\} + \text{Im}\{SP\_res(t, 1)\} \geq \alpha \times \\ & [\text{Re}\{SP\_res(t, 1\max)\} + \\ & \text{Im}\{SP\_res(t, 1\max)\}] \\ 0 & \text{Re}\{SP\_res(t, 1)\} + \text{Im}\{SP\_res(t, 1)\} < \alpha \times \\ & [\text{Re}\{SP\_res(t, 1\max)\} + \text{Im}\{SP\_res(t, 1\max)\}] \end{cases} \quad \text{[Formula 4]}$$

Here, t is the OFDM symbol time, l is the delay time, lmax is the delay time of the complex gain which becomes the largest addition results, SP_ph(t) is the threshold value comparison output, SP_res(t,l) is the complex gain, and α is the threshold value computing coefficient and 1>α.

As described above, in accordance with the equalizer and the equalization method of the second exemplary embodiment, there is no need to compute the square in order to determined the electric power value for each path. Accordingly, the equalizer and the equalization method of the second exemplary embodiment can be used even in demodulation requiring high-speed processing.

Third Exemplary Embodiment

In an equalizer and equalization method of a third exemplary embodiment, the correction vector converting method is different than in the first and second exemplary embodiments. The correction vector converting circuits of the first and second exemplary embodiments extract only the phase component of the transfer path estimation corresponding to each sub-carrier. On the other hand, the correction vector converting circuit of the third exemplary embodiment extracts the phase component and the amplitude.

Concretely, the correction vector converting circuit of the third exemplary embodiment generates a correction vector, which becomes the reciprocal for each sub-carrier, by using the following formula.

$$SubC\_T = \frac{Re[SubC] - jIm[SubC]}{Re[SubC]^2 + Im[SubC]^2} \quad [\text{Formula 5}]$$

Here, SubC_T is the correction vector, and SubC is the transfer path estimation results of each sub-carrier.

As described above, the equalizer and the equalization method of the third exemplary embodiment can handle Quadrature Amplitude Modulation (QAM) which includes amplitude information.

Note that the correction vector converting circuit of the third exemplary embodiment can be combined with the equalizer and equalization method of the second exemplary embodiment. In this case, the combined equalizer and equalization method can have the effects of the second exemplary embodiment and the third exemplary embodiment.

Fourth Exemplary Embodiment

An equalizer and equalization method of a fourth exemplary embodiment will be described next by using the drawings. To summarize the equalizer and equalization method of the fourth exemplary embodiment by using FIG. 1, by using the pilot symbols of the current (e.g., t3) OFDM symbol and the pilot symbols of the OFDM symbol which is two symbols before that (e.g., t1), the equalizer and equalization method of the fourth exemplary embodiment demodulate the OFDM symbol which is one symbol before (e.g., t2).

Figure 6:
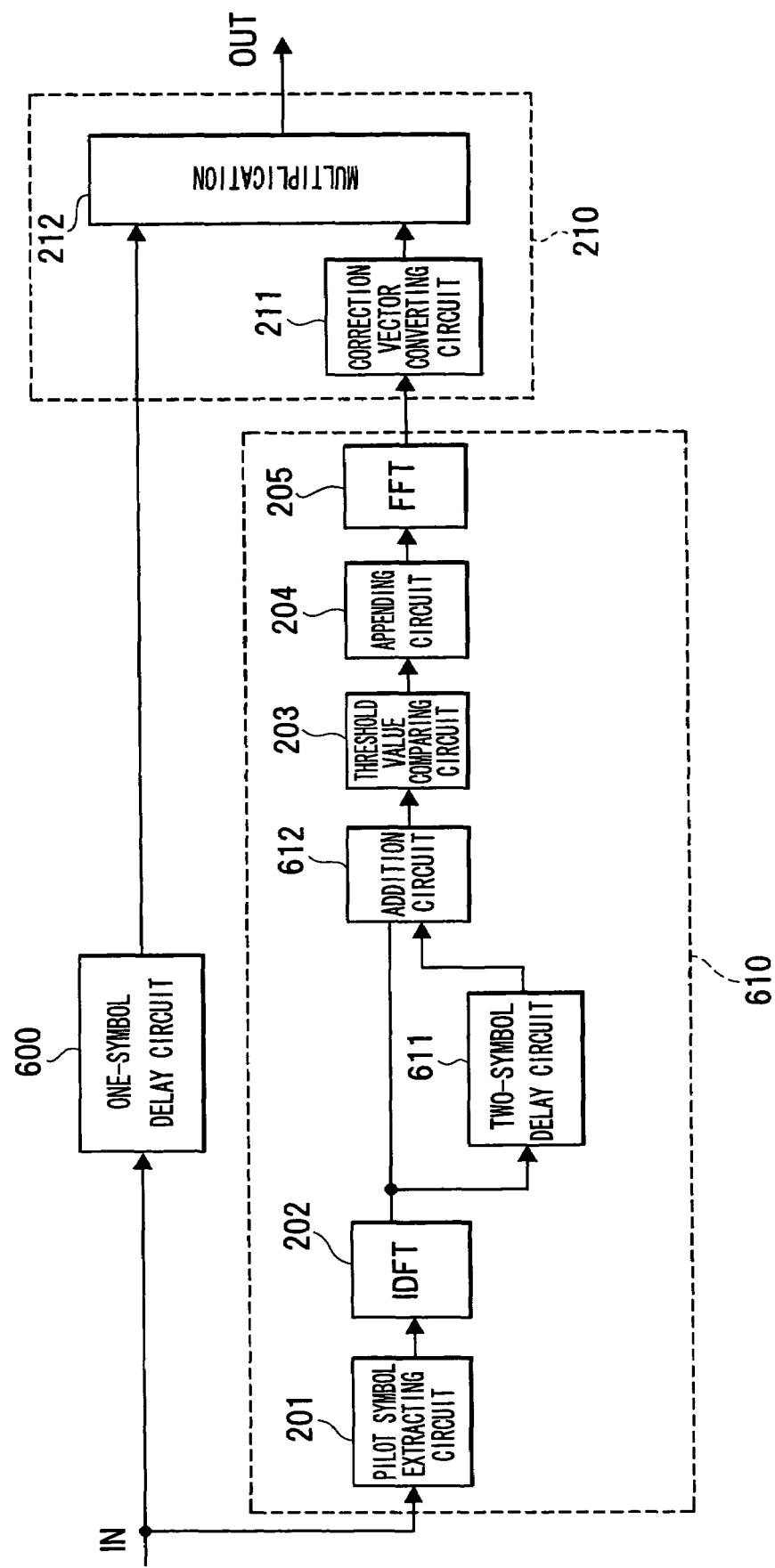
FIG. 6 is a block diagram showing the structure of an equalizer of a fourth exemplary embodiment.

FIG. 6 is a block diagram showing the structure of the equalizer of the fourth exemplary embodiment. The equalizer of the fourth exemplary embodiment includes a one-symbol delay circuit 600, a channel estimating section 610, and the equalization computing section 210. Here, description of structures which are the same as those of the previously-described exemplary embodiments will be omitted.

The one-symbol delay circuit 600 is structured by a Random Access Memory (hereinafter, "RAM"), and delays the inputted signal by a period of time corresponding to one symbol, and outputs the delayed inputted signal.

The channel estimating section 610 includes the pilot symbol extracting circuit 201, the inverse discrete Fourier transform circuit 202, a two-symbol delay circuit 611, an addition circuit 612, the threshold value comparing circuit 203, the appending circuit 204, and the fast Fourier transform circuit 205.

The two-symbol delay circuit 611 is structured by a RAM, and delays the complex gain outputted from the inverse discrete Fourier transform circuit 202 by a period of time corresponding to two symbols, and outputs the delayed complex gain.

Figure 7:
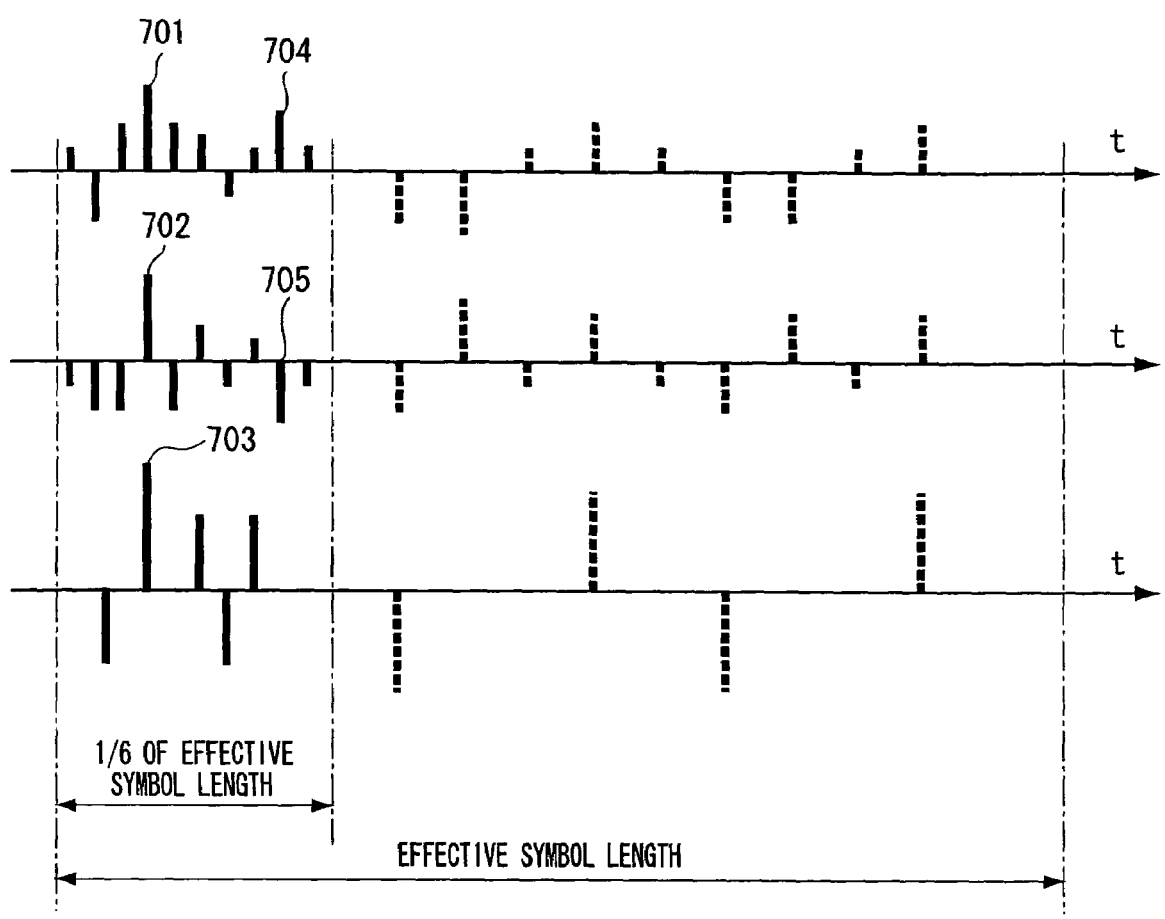
FIG. 7 is a graph showing the relation between time and the real part component of each complex gain.

The addition circuit 612 adds the complex gain outputted from the inverse discrete Fourier transform circuit 202 and the delayed complex gain outputted from the two-symbol delay circuit 611. Here, due to the addition circuit 612 using two values (the complex gain outputted from the inverse discrete Fourier transform circuit 202 and the delayed complex gain outputted from the two-symbol delay circuit 611), the delay time width of the complex gain which can be theoretically estimated is ⅙ of the effective OFDM symbol length. Accordingly, the complex gains which are handled at the addition circuit 612 are ⅙ of the entire complex gain outputted from the inverse discrete Fourier transform circuit 202, and ⅙ of the entire delayed complex gain outputted from the two-symbol delay circuit 611. Note that, in a case in which the complex gain which the two-symbol delay circuit 611 receives from the inverse discrete Fourier transform circuit 202 is ⅙ of the entire complex gain outputted from the inverse discrete Fourier transform circuit 202, the addition circuit 612 may, of course, handle the entire delayed complex gain which is outputted from the two-symbol delay circuit 611. Here, operation of the addition circuit 612 will be described by using the drawings. FIG. 7 is a graph showing the relationship between time and the real part component of each complex gain. The solid lines in the graph are real part components which are within ⅙ of the effective OFDM symbol length, and the dotted lines of the graph are real part components which are not in ⅙ of the effective OFDM symbol length. Namely, the real part components which are the dotted lines in the graph are not components which are objects of computation of the addition circuit 612. In accordance with the addition circuit 612, the opposite phase components of the complex gain outputted from the inverse discrete Fourier transform circuit 202 and the delayed complex gain outputted from the two-symbol delay circuit 611 are eliminated, and the same phase components remain. For example, in a case in which a delayed complex gain 701 outputted from the two-symbol delay circuit 611 and a complex gain 702 outputted from the inverse discrete Fourier transform circuit 202 exist at the same point in time, because they are the same phase, the addition circuit 612 computes a complex gain 703 in which these two complex gains are added. On the other hand, in a case in which a delayed complex gain 704 outputted from the two-symbol delay circuit 611 and a complex gain 705 outputted from the inverse discrete Fourier transform circuit 202 exist at the same point in time, because they are opposite phases, the addition circuit 612 computes the difference (complex gain 706) of these two complex gains.

The equalization computing circuit 210 multiplies the one-symbol delayed inputted signal, and the output of the correction vector converting circuit 211, by a complex. In this way, the phase rotation received at the transfer path is eliminated, and demodulated data OUT is outputted.

As described above, in accordance with the equalizer and the equalization method of the fourth exemplary embodiment, the effects of the equalizer and the equalization method of the first exemplary embodiment are exhibited.

Further, in accordance with the equalizer and the equalization method of the fourth exemplary embodiment, transfer path estimation is carried out by using two OFDM symbols. Therefore, in cases in which the changes in the transfer function of the transfer path are extremely small, highly accurate equalization can be carried out by estimating the transfer path by using one OFDM symbol.

Moreover, in accordance with the equalizer and the equalization method of the fourth exemplary embodiment, because transfer path estimation is carried out by using two OFDM symbols, the sub-carrier arrangement of the scattered pilot symbols is equivalent to a 6 sub-carrier period. Therefore, the time width of an arrival path whose transfer path can be estimated is twice that of a case in which transfer path estimation is carried out by using one symbol. Accordingly, the equalizer and the equalization method of the fourth exemplary embodiment can equalize delay paths having longer arrival times.

In addition, in accordance with the equalizer and the equalization method of the fourth exemplary embodiment, transfer path estimation is carried out by using scattered pilot symbols which are included in the one OFDM symbol before and the one OFDM symbol after the OFDM symbol whose transfer path is corrected equivalently. Accordingly, the equalizer and the equalization method of the fourth exemplary embodiment can make the error small even if the transfer function of the transfer path fluctuates due to phasing or the like.

Fifth Exemplary Embodiment

An equalizer and equalization method of a fifth exemplary embodiment will be described next by using the drawings. To summarize the equalizer and equalization method of the fifth exemplary embodiment by using FIG. 1, in the same way as the equalizer and equalization method of the fourth exemplary embodiment, by using the pilot symbols of the current (e.g., t3) OFDM symbol and the pilot symbols of OFDM symbol which is two symbols before that (e.g., t1), the equalizer and equalization method of the fifth exemplary embodiment demodulate the OFDM symbol which is one symbol before (e.g., t2).

Figure 8:
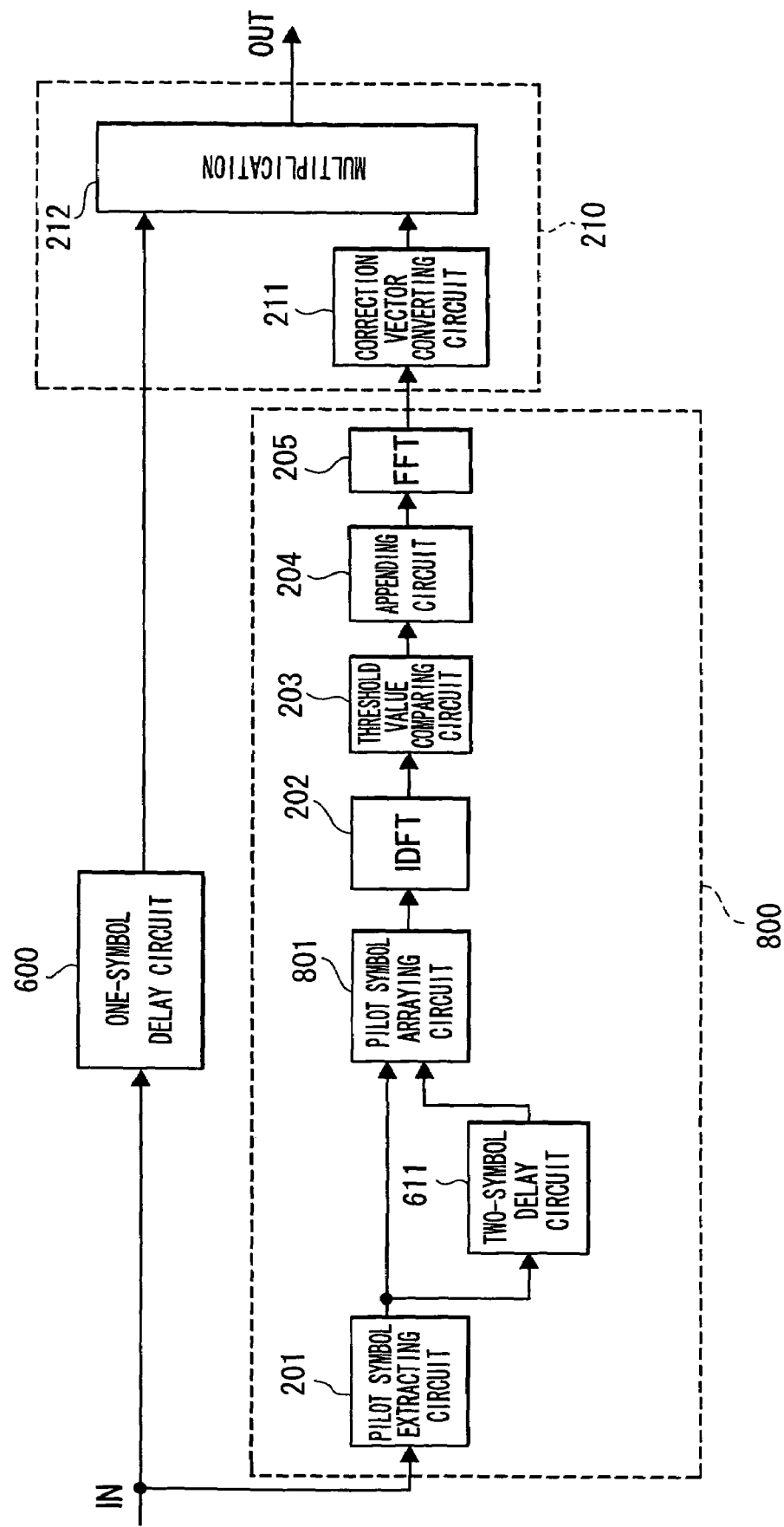
FIG. 8 is a block diagram showing the structure of an equalizer of a fifth exemplary embodiment.

FIG. 8 is a block diagram showing the structure of the equalizer of the fifth exemplary embodiment. The equalizer of the fifth exemplary embodiment includes the one-symbol delay circuit 600, a channel estimating section 800, and the equalization computing section 210. Here, description of structures which are the same as those of the previously-described exemplary embodiments will be omitted.

The channel estimating section 800 includes the pilot symbol extracting circuit 201, the two-symbol delay circuit 611, a pilot symbol arraying circuit 801, the inverse discrete Fourier transform circuit 202, the threshold value comparing circuit 203, the appending circuit 204, and the fast Fourier transform circuit 205.

The two-symbol delay circuit 611 of the fifth exemplary embodiment is structured by a RAM, and delays the pilot symbols extracted by the pilot symbol extracting circuit 201 by a period of time corresponding to two symbols, and outputs the delayed pilot symbols.

The pilot symbol arraying circuit 801 combines the extracted pilot symbols and the delayed pilot symbols, and outputs the combined pilot symbols. For example, in a case in which the data array of the extracted pilot symbols is 000P000P000 and the data array of the delayed pilot symbols is 0P000P000P0, the data array of the combined pilot symbols is 0P0P0P0P0P0. Here, P represents a pilot symbol.

The inverse discrete Fourier transform circuit 202 of the fifth exemplary embodiment determines the complex gain for each arrival path, on the basis of the combined pilot symbols which are outputted from the pilot symbol arraying circuit 801.

As described above, in accordance with the equalizer and the equalization method of the fifth exemplary embodiment, the effects of the equalizers and the equalization methods of the first and fourth exemplary embodiments are exhibited.

Sixth Exemplary Embodiment

An equalizer and equalization method of a sixth exemplary embodiment will be described next by using the drawings. To summarize the equalizer and equalization method of the sixth exemplary embodiment by using FIG. 1, by using the pilot symbols of the current (e.g., t5) OFDM symbol, the pilot symbols of the OFDM symbol which is one symbol before (e.g., t4), the pilot symbols of the OFDM symbol which is two symbols before (e.g., t3), and the pilot symbols of the OFDM symbol which is three symbols before (e.g., t2), the equalizer and equalization method of the sixth exemplary embodiment demodulate the OFDM symbol which is one symbol before (e.g., t4).

Figure 9:
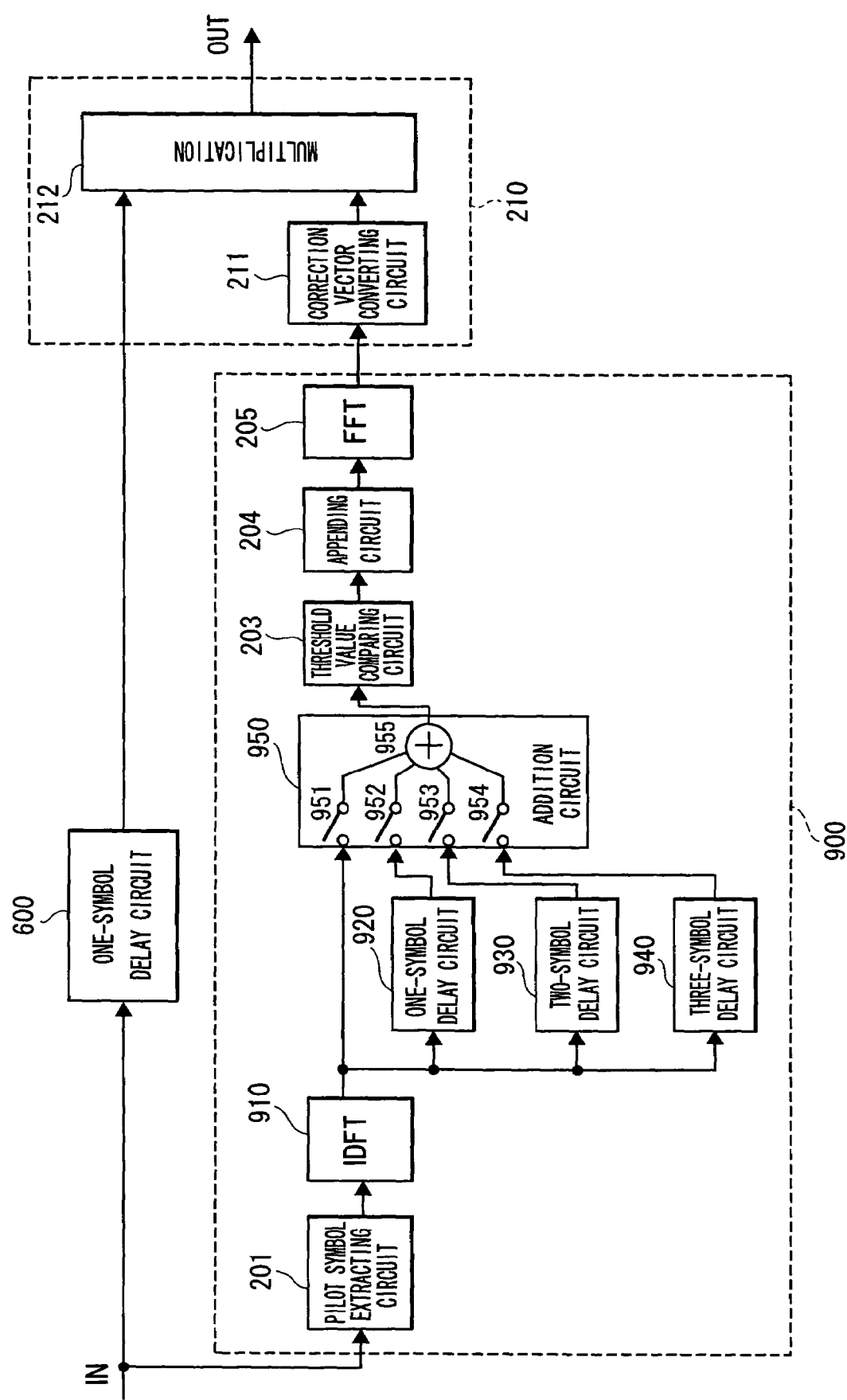
FIG. 9 is a block diagram showing the structure of an equalizer of a sixth exemplary embodiment.

FIG. 9 is a block diagram showing the structure of the equalizer of the sixth exemplary embodiment. The equalizer of the sixth exemplary embodiment includes the one-symbol delay circuit 600, a channel estimating section 900, and the equalization computing section 210. Here, description of structures which are the same as those of the previously-described exemplary embodiments will be omitted.

The channel estimating section 900 includes the pilot symbol extracting circuit 201, an inverse discrete Fourier transform circuit 910, a one-symbol delay circuit 920, a two-symbol delay circuit 930, a three-symbol delay circuit 940, an addition circuit 950, the threshold value comparing circuit 203, the appending circuit 204, and the fast Fourier transform circuit 205.

The inverse discrete Fourier transform circuit 910 carries out the same operation as the previously-described inverse discrete Fourier transform circuit 202. Further, the inverse discrete Fourier transform circuit 910 holds the previous computation results until the next computation is executed.

The one-symbol delay circuit 920 is structured by a RAM, and delays the complex gain outputted from the inverse discrete Fourier transform circuit 910 by a period of time corresponding to one symbol, and holds it. Then, in accordance with a read-out request, the one-symbol delay circuit 920 outputs the delayed complex gain. Similarly, the two-symbol delay circuit 930 and the three-symbol delay circuit 940 also are structured by RAMs. The two-symbol delay circuit 930 delays the complex gain outputted from the inverse discrete Fourier transform circuit 910 by a period of time corresponding to two symbols, and holds it. The three-symbol delay circuit 940 delays the complex gain outputted from the inverse discrete Fourier transform circuit 910 by a period of time corresponding to three symbols, and holds it. Then, in accordance with read-out requests, the respective delay circuits output the respective delayed complex gains.

The addition circuit 950 has a switching section, which is structured by switches 951 through 954, and an addition section 955. The switch 951 is connected to the inverse discrete Fourier transform circuit 910 and the addition section 955, the switch 952 is connected to the one-symbol delay circuit 920 and the addition section 955, the switch 953 is connected to the two-symbol delay circuit 930 and the addition section 955, and the switch 954 is connected to the three-symbol delay circuit 940 and the addition section 955. Due to the switching of the switches 951 through 954, the addition circuit 950 adds the complex gain outputted from the inverse discrete Fourier transform circuit 910, and the respective delayed complex gains outputted from the one-symbol delay circuit 920, the two-symbol delay circuit 930, and the three-symbol delay circuit 940. Combinations which connect, by the switches, the signals to be added include the following three types: a state in which only the switch 952 is ON, a state in which only the switches 951, 953 are ON, and a state in which all of the switches 951, 952, 953, 954 are ON. In the state in which only the switch 952 is ON, transfer path estimation is carried out at only the pilot symbols which are included in one OFDM symbol, in the same way as in the first exemplary embodiment. In the state in which only the switches 951, 953 are ON, transfer path estimation is carried out at only the pilot symbols which are included in two OFDM symbols, in the same way as in the fifth exemplary embodiment. In the state in which all of the switches 951 through 954 are ON, transfer path estimation is carried out at only the pilot symbols which are included in four OFDM symbols, in the same way as in the present exemplary embodiment. Here, in the state in which all of the switches 951 through 954 are ON, because the addition circuit 950 carries out addition by using four complex gains, the delay time width of the complex gain which can theoretically be estimated is $1/3$ of the effective OFDM symbol length. In contrast, in the state in which only the switches 951, 953 are ON, it is $1/6$ of the effective OFDM symbol length in the same way as in the fifth exemplary embodiment. In the state in which only the switch 952 is ON, it is $1/12$ of the effective OFDM symbol length in the same way as in the first exemplary embodiment. In addition, the threshold value comparing circuit 203 and the appending circuit 204 carry out operations in accordance with this length.

As described above, in accordance with the equalizer and the equalization method of the sixth exemplary embodiment, the effects of the equalizer and the equalization method of the first exemplary embodiment are exhibited.

Further, in accordance with the equalizer and the equalization method of the sixth exemplary embodiment, transfer path estimation is carried out by using four OFDM symbols. Therefore, in cases in which the changes in the transfer function of the transfer path are extremely small, highly accurate equalization can be carried out by estimating the transfer path by using one OFDM symbol.

Moreover, in accordance with the equalizer and the equalization method of the sixth exemplary embodiment, because transfer path estimation is carried out by using one OFDM symbol, the sub-carrier arrangement of the scattered pilot symbols is equivalent to a 3 sub-carrier period. Therefore, the time width of an arrival path whose transfer path can be estimated is four times that of a case in which transfer path estimation is carried out by using one symbol. Accordingly, the equalizer and the equalization method of the sixth exemplary embodiment can equalize delay paths having longer arrival times.

In addition, in accordance with the equalizer and the equalization method of the sixth exemplary embodiment, transfer path estimation is carried out by using scattered pilot symbols which are included in the OFDM symbol whose transfer path is corrected equivalently, the one OFDM symbol before, the one OFDM symbol after, and the OFDM symbol which is two before. Accordingly, even if the transfer function of the transfer path fluctuates due to phasing or the like, the equalizer and the equalization method of the sixth exemplary embodiment can make the error smaller than transfer path estimation at the SPs of four OFDM symbols using scattered pilot symbols included in the OFDM symbol which is one before, the OFDM symbol which is two before, and the OFDM symbol which is three before the OFDM symbol whose transfer path is corrected.

Seventh Exemplary Embodiment

An equalizer and equalization method of a seventh exemplary embodiment will be described hereinafter by using the drawings. To summarize the equalizer and equalization method of the seventh exemplary embodiment by using FIG. 1, the equalizer and equalization method of the seventh exemplary embodiment demodulate the current (e.g., t3) OFDM symbol by using the pilot symbols of the current (e.g., t3) OFDM symbol.

Figure 10:
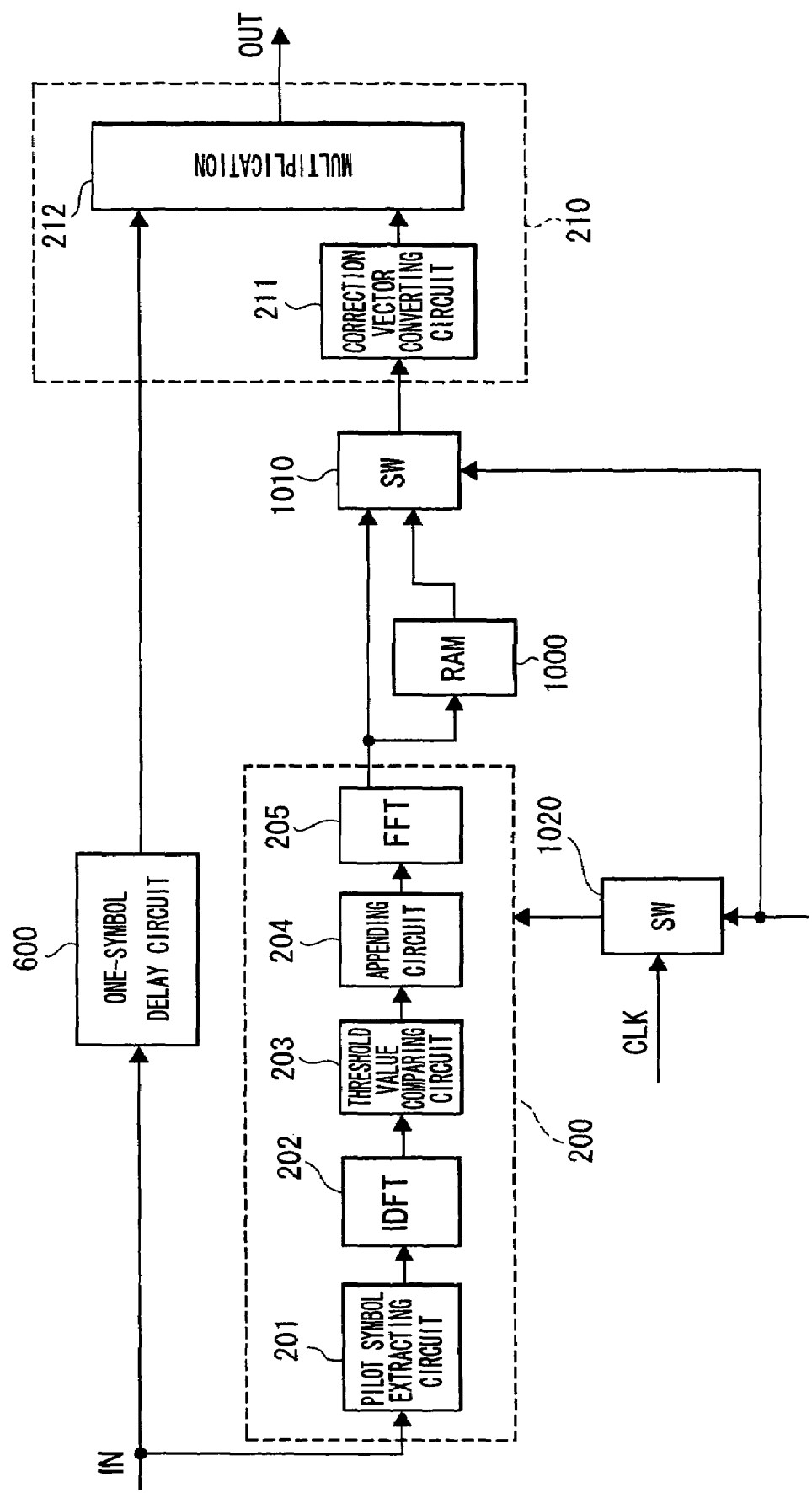
FIG. 10 is a block diagram showing the structure of an equalizer of a seventh exemplary embodiment.

FIG. 10 is a block diagram showing the structure of the equalizer of the seventh exemplary embodiment. The equalizer of the seventh exemplary embodiment includes the channel estimating section 200, the equalization computing section 210, a RAM 1000, and switches 1010, 1020. Here, description of structures which are the same as those of the previously-described exemplary embodiments will be omitted.

The RAM 1000 is connected to the channel estimating section 200, and delays the transfer path estimation results generated at the channel estimating section 200 by a period of time corresponding to one symbol, and outputs them.

The switch 1010 connects the channel estimating section 200, the RAM 1000, and the equalization computing section 210. On the basis of an intermittent operation control signal which instructs intermittent operation, the switch 1010 supplies to the equalization computing section 210 either the transfer path estimation results generated at the channel estimating section 200 or the transfer path estimation results delayed at the RAM 1000.

The switch 1020 is connected to the channel estimating section 200, and, on the basis of the intermittent operation control signal, stops the supply of a clock signal CLK to the channel estimating section 200. Namely, at the time of intermittent operation, the clock signal CLK is not supplied to the channel estimating section 200, and the operation stops.

As described above, the equalizer and equalization method of the seventh exemplary embodiment achieve the same effects as the equalizer and equalization method of the first exemplary embodiment.

Note that, when there are no changes in or small changes in the transfer path characteristic, the changes in the transfer path estimation information are small. Therefore, there are cases in which a large error does not arise in the reception characteristic, even if transfer path estimation information is not generated per each OFDM symbol but is generated per several OFDM symbols. In such cases, in accordance with the equalizer and equalization method of the seventh exemplary embodiment, equalization processing is carried out by using transfer path estimation information which was generated in the past, without generating transfer path estimation information for each OFDM symbol. Accordingly, in accordance with the equalizer and equalization method of the seventh exemplary embodiment, the channel estimating section for obtaining transfer path estimation information is stopped, and the consumed electric power needed in order to operate the channel estimating section can be reduced.

Eighth Exemplary Embodiment

An equalizer and equalization method of an eighth exemplary embodiment will be described next by using the drawings. To summarize the equalizer and equalization method of the eighth exemplary embodiment by using FIG. 1, by using the pilot symbols of the OFDM symbol (e.g., t2) which is one symbol before the current OFDM symbol (e.g., t3), the equalizer and equalization method of the eighth exemplary embodiment demodulate the OFDM symbol which is one symbol before.

Figure 11:
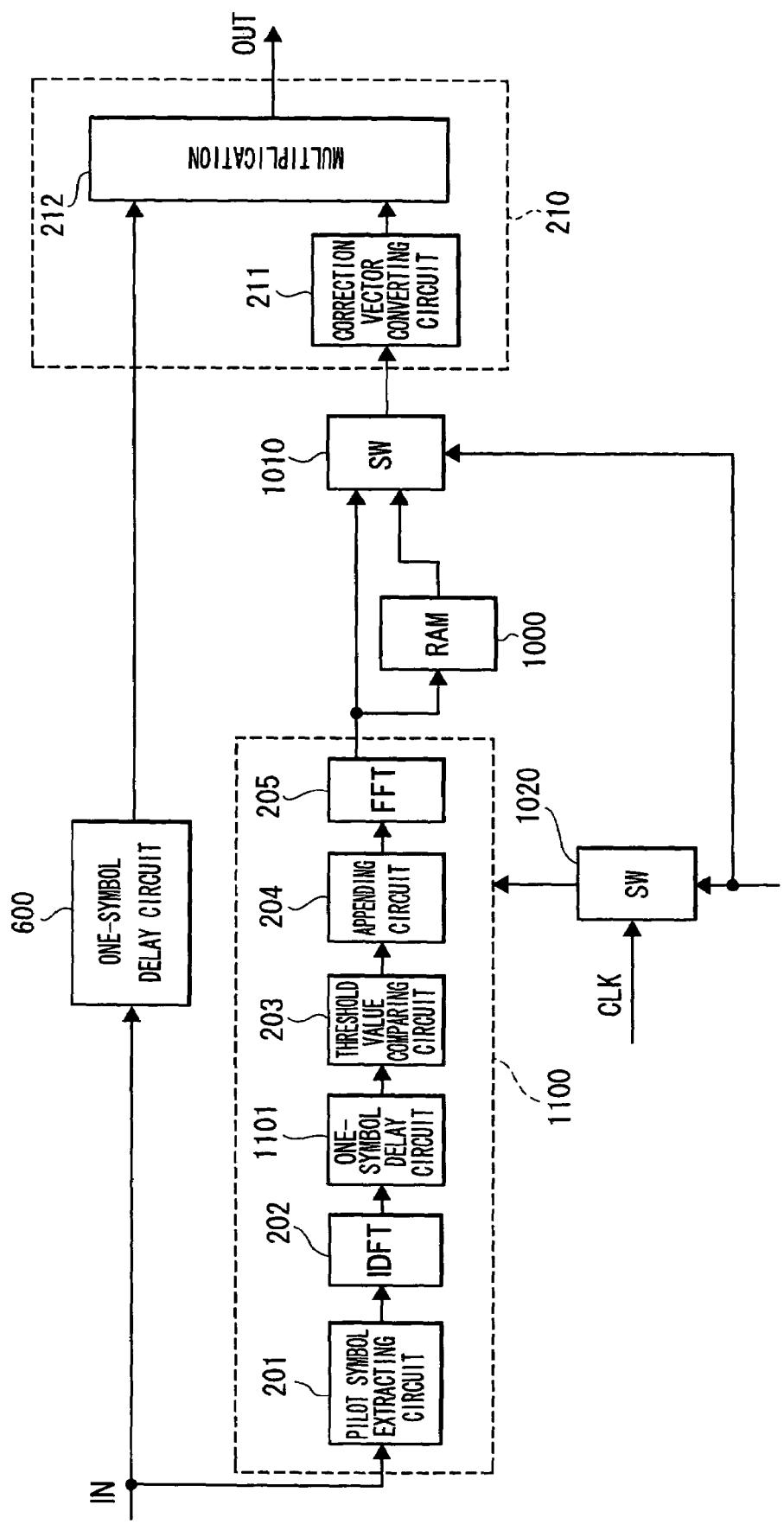
FIG. 11 is a block diagram showing the structure of an equalizer of an eighth exemplary embodiment.

FIG. 11 is a block diagram showing the structure of the equalizer of the eighth exemplary embodiment. The equalizer of the eighth exemplary embodiment includes a channel estimating section 1100, the equalization computing section 210, the one-symbol delay circuit 600, the RAM 1000, and the switches 1010, 1020. Here, description of structures which are the same as those of the previously-described exemplary embodiments will be omitted.

The channel estimating section 1100 includes the pilot symbol extracting circuit 201, the inverse discrete Fourier transform circuit 202, a one-symbol delay circuit 1101, the threshold value comparing circuit 203, the appending circuit 204, and the fast Fourier transform circuit 205.

The one-symbol delay circuit 1101 is structured by a RAM, and delays the complex gain outputted from the inverse discrete Fourier transform circuit 202 by a period of time corresponding to one symbol, and outputs the delayed complex gain.

As described above, the equalizer and equalization method of the eighth exemplary embodiment achieve the same effects as the equalizers and equalization methods of the first and seventh exemplary embodiments.

Ninth Exemplary Embodiment

An equalizer and equalization method of a ninth exemplary embodiment will be described next by using the drawings. To summarize the equalizer and equalization method of the ninth exemplary embodiment by using FIG. 1, by using the pilot symbols of the current (e.g., t3) OFDM symbol and the pilot symbols of the OFDM symbol which is two symbols before (e.g., t1), the equalizer and equalization method of the ninth exemplary embodiment demodulate the OFDM symbol which is one symbol before (e.g., t2), in the same way as the equalizer and equalization method of the fifth exemplary embodiment.

Figure 12:
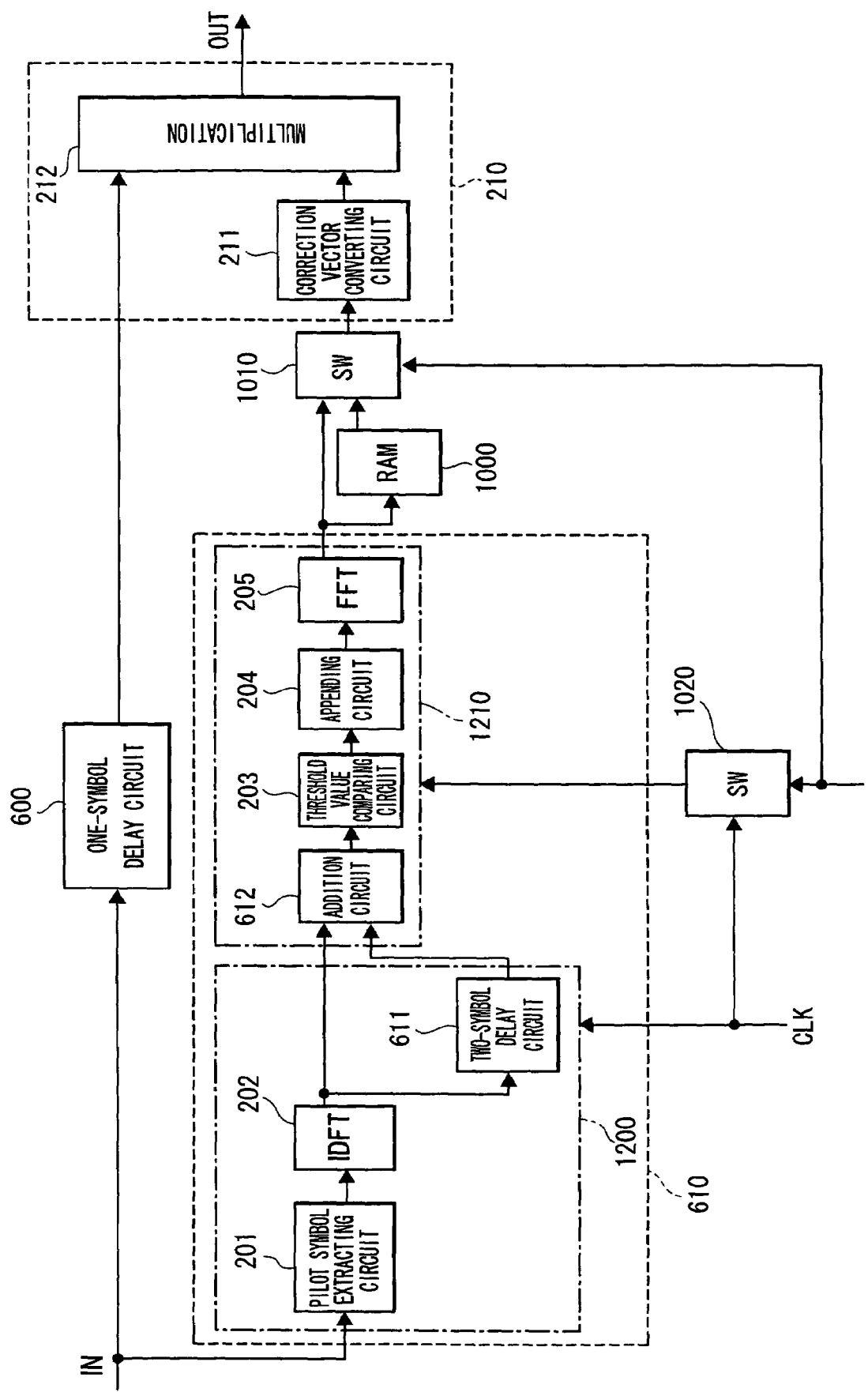
FIG. 12 is a block diagram showing the structure of an equalizer of a ninth exemplary embodiment.

FIG. 12 is a block diagram showing the structure of the equalizer of the ninth exemplary embodiment. The equalizer of the ninth exemplary embodiment includes the one-symbol delay circuit 600, the channel estimating section 610, the RAM 1000, the switches 1010, 1020, and the equalization computing section 210. Here, description of structures which are the same as those of the previously-described exemplary embodiments will be omitted.

The channel estimating section 610 is divided into a first area 1200 and a second area 1210. The first area 1200 is structured by the pilot symbol extracting circuit 201, the inverse discrete Fourier transform circuit 202, and the two-symbol delay circuit 611. The second area 1210 is structured by the addition circuit 612, the threshold value comparing circuit 203, the appending circuit 204, and the fast Fourier transform circuit 205. The clock signal CLK is supplied to both areas, and the clock signal CLK supplied to the second area 1210 is supplied via the switch 1020 which is controlled by the intermittent operation control signal. Namely, at the time of intermittent operation, the clock signal CLK is not supplied to the second area 1210.

As described above, the equalizer and equalization method of the ninth exemplary embodiment achieve the same effects as the equalizers and equalization methods of the first and fourth exemplary embodiments.

Moreover, in accordance with the equalizer and equalization method of the ninth exemplary embodiment, at the time of intermittent operation, operation of the first area is not stopped, and only operation of the second area is stopped. In this way, even immediately after the operation of the second area starts again, it is possible to generate a transfer path estimation value using the pilot symbols included in the OFDM symbol which is two before and in the current OFDM symbol.

Tenth Exemplary Embodiment

An equalizer and equalization method of a tenth exemplary embodiment will be described next by using the drawings. To summarize the equalizer and equalization method of the tenth exemplary embodiment by using FIG. 1, by using the pilot symbols of the current (e.g., t3) OFDM symbol and the pilot symbols of the OFDM symbol which is two symbols before (e.g., t1), the equalizer and equalization method of the tenth exemplary embodiment demodulate the OFDM symbol which is one symbol before (e.g., t2), in the same way as the equalizer and equalization method of the sixth exemplary embodiment.

Figure 13:
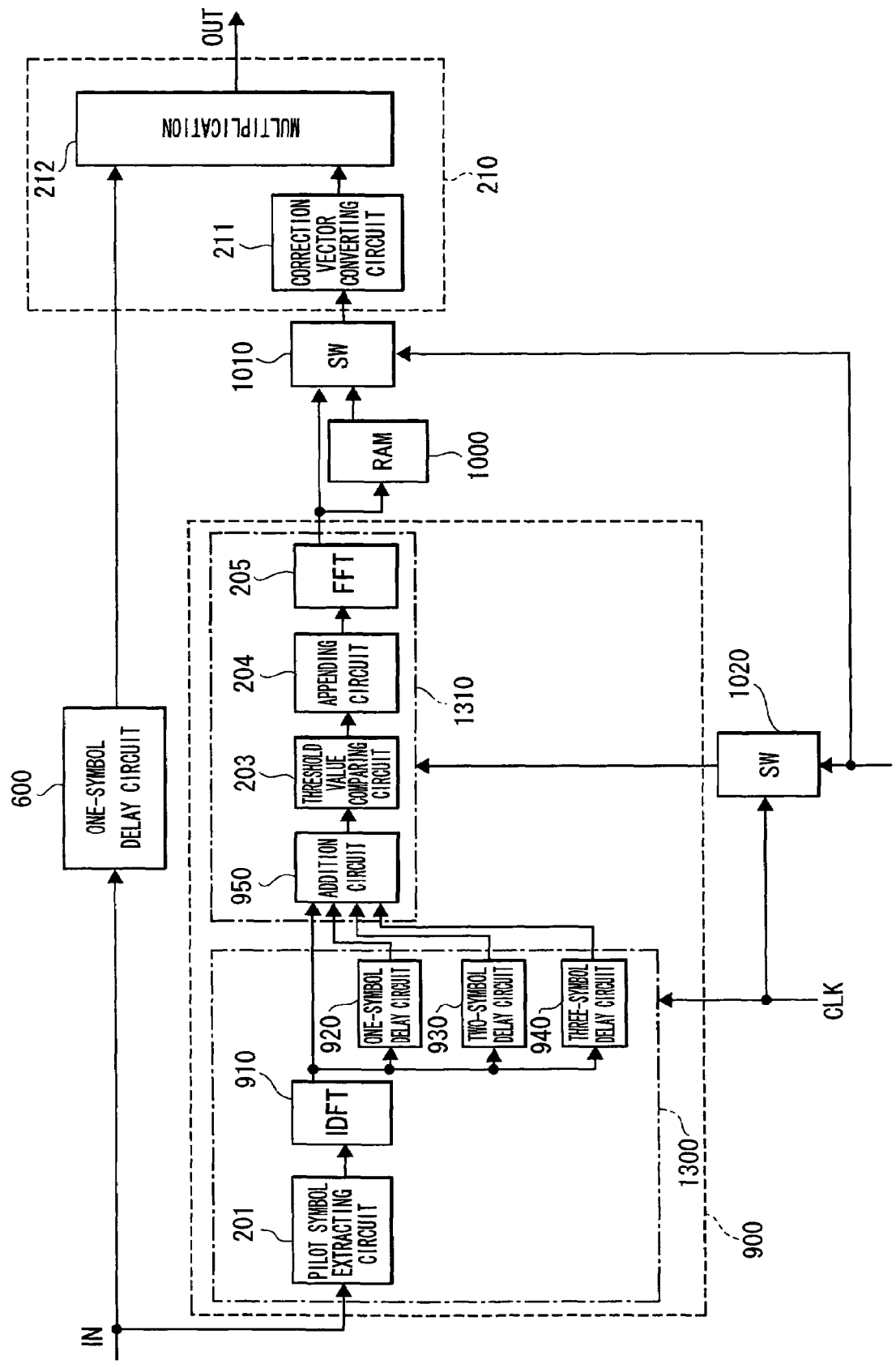
FIG. 13 is a block diagram showing the structure of an equalizer of a tenth exemplary embodiment.

FIG. 13 is a block diagram showing the structure of the equalizer of the tenth exemplary embodiment. The equalizer of the tenth exemplary embodiment includes the one-symbol delay circuit 600, the channel estimating section 900, the RAM 1000, the switches 1010, 1020, and the equalization computing section 210. Here, description of structures which are the same as those of the previously-described exemplary embodiments will be omitted.

The channel estimating section 900 is divided into a first area 1300 and a second area 1310. The first area 1300 is structured by the pilot symbol extracting circuit 201, the inverse discrete Fourier transform circuit 910, the one-symbol delay circuit 920, the two-symbol delay circuit 930, and the three-symbol delay circuit 940. The second area 1310 is structured by the addition circuit 950, the threshold value comparing circuit 203, the appending circuit 204, and the fast Fourier transform circuit 205. The clock signal CLK is supplied to both areas, and the clock signal CLK supplied to the second area 1310 is supplied via the switch 1020 which is controlled by the intermittent operation control signal. Namely, at the time of intermittent operation, the clock signal CLK is not supplied to the second area 1310.

As described above, the equalizer and equalization method of the tenth exemplary embodiment achieve the same effects as the equalizers and equalization methods of the first, sixth and ninth exemplary embodiments.

Eleventh Exemplary Embodiment

An equalizer and equalization method of an eleventh exemplary embodiment will be described next by using the drawings. To summarize the equalizer and equalization method of the eleventh exemplary embodiment by using FIG. 1, by using the pilot symbols of the current (e.g., t3) OFDM symbol and the pilot symbols of the OFDM symbol which is two symbols before (e.g., t1), the equalizer and equalization method of the eleventh exemplary embodiment demodulate the OFDM symbol which is one symbol before (e.g., t2), in the same way as the equalizer and equalization method of the sixth exemplary embodiment.

Figure 14:
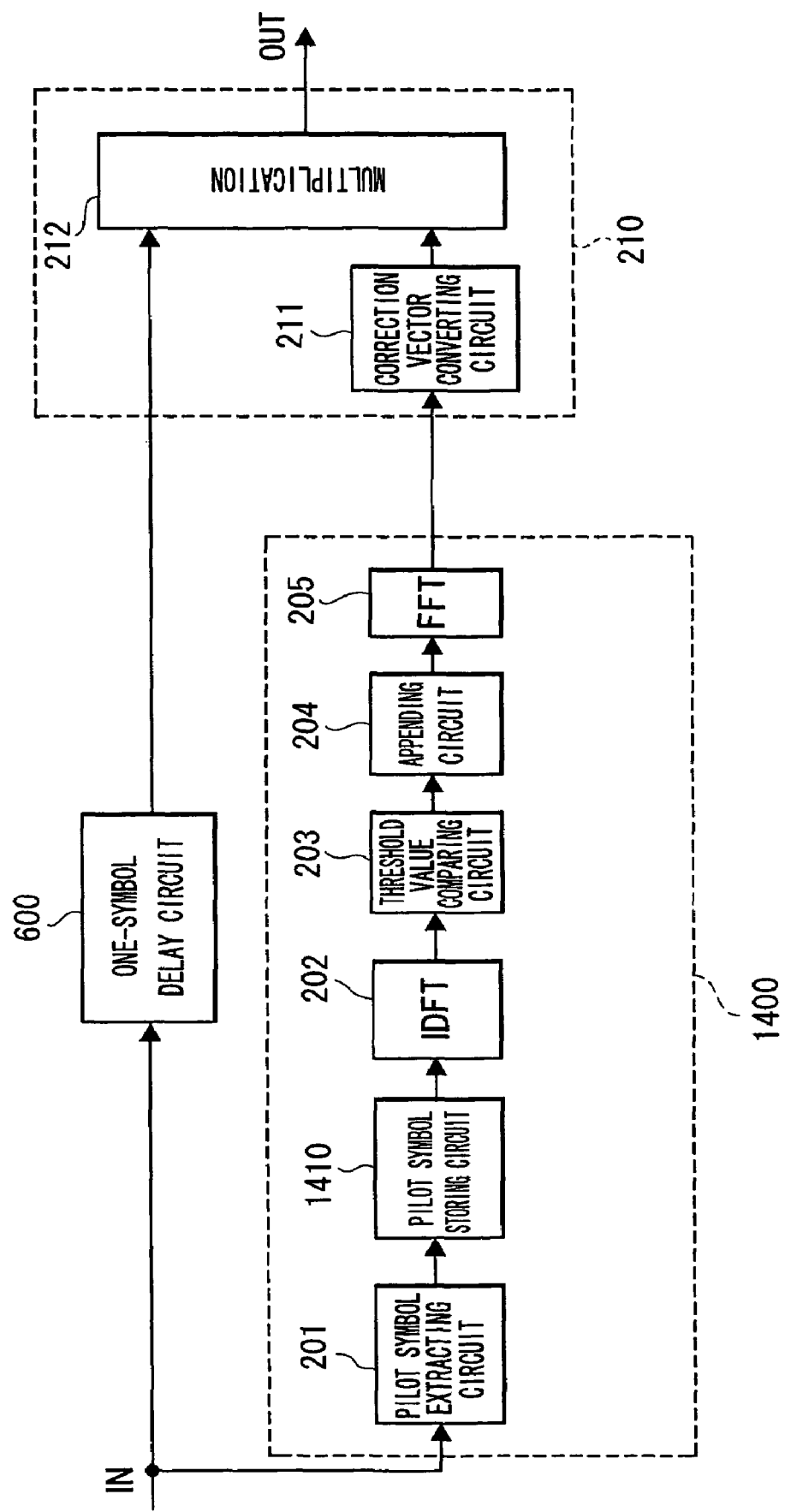
FIG. 14 is a block diagram showing the structure of an equalizer of an eleventh exemplary embodiment.

FIG. 14 is a block diagram showing the structure of the equalizer of the eleventh exemplary embodiment. The equalizer of the eleventh exemplary embodiment includes the one-symbol delay circuit 600, a channel estimating section 1400, and the equalization computing section 210. Here, description of structures which are the same as those of the previously-described exemplary embodiments will be omitted.

The channel estimating section 1400 has the pilot symbol extracting circuit 201, a pilot symbol storing circuit 1410, the inverse discrete Fourier transform circuit 202, the threshold value comparing circuit 203, the appending circuit 204, and the fast Fourier transform circuit 205.

The pilot symbol storing circuit 1410 is structured by a RAM, and stores the pilot symbols extracted from the current OFDM symbol, the pilot symbols extracted from the OFDM symbol which is one symbol before, the pilot symbols extracted from the OFDM symbol which is two symbols before, and the pilot symbols extracted from the OFDM symbol which is three symbols before. The pilot symbol storing circuit 1410 outputs stored pilot symbols in accordance with a control signal (not shown). In this case, the pilot symbol storing circuit 1410 may output the pilot symbols of only one symbol, or may output in combination the pilot symbols of plural symbols.

As described above, the equalizer and equalization method of the eleventh exemplary embodiment achieve the same effects as the equalizers and equalization methods of the first and sixth exemplary embodiments.

Twelfth Exemplary Embodiment

An equalizer and equalization method of a twelfth exemplary embodiment will be described next by using the drawings. To summarize the equalizer and equalization method of the twelfth exemplary embodiment by using FIG. 1, by using the pilot symbols of the current (e.g., t3) OFDM symbol and the pilot symbols of the OFDM symbol which is two symbols before (e.g., t1), the equalizer and equalization method of the twelfth exemplary embodiment demodulate the OFDM symbol which is one symbol before (e.g., t2), in the same way as the equalizer and equalization method of the eleventh exemplary embodiment.

Figure 15:
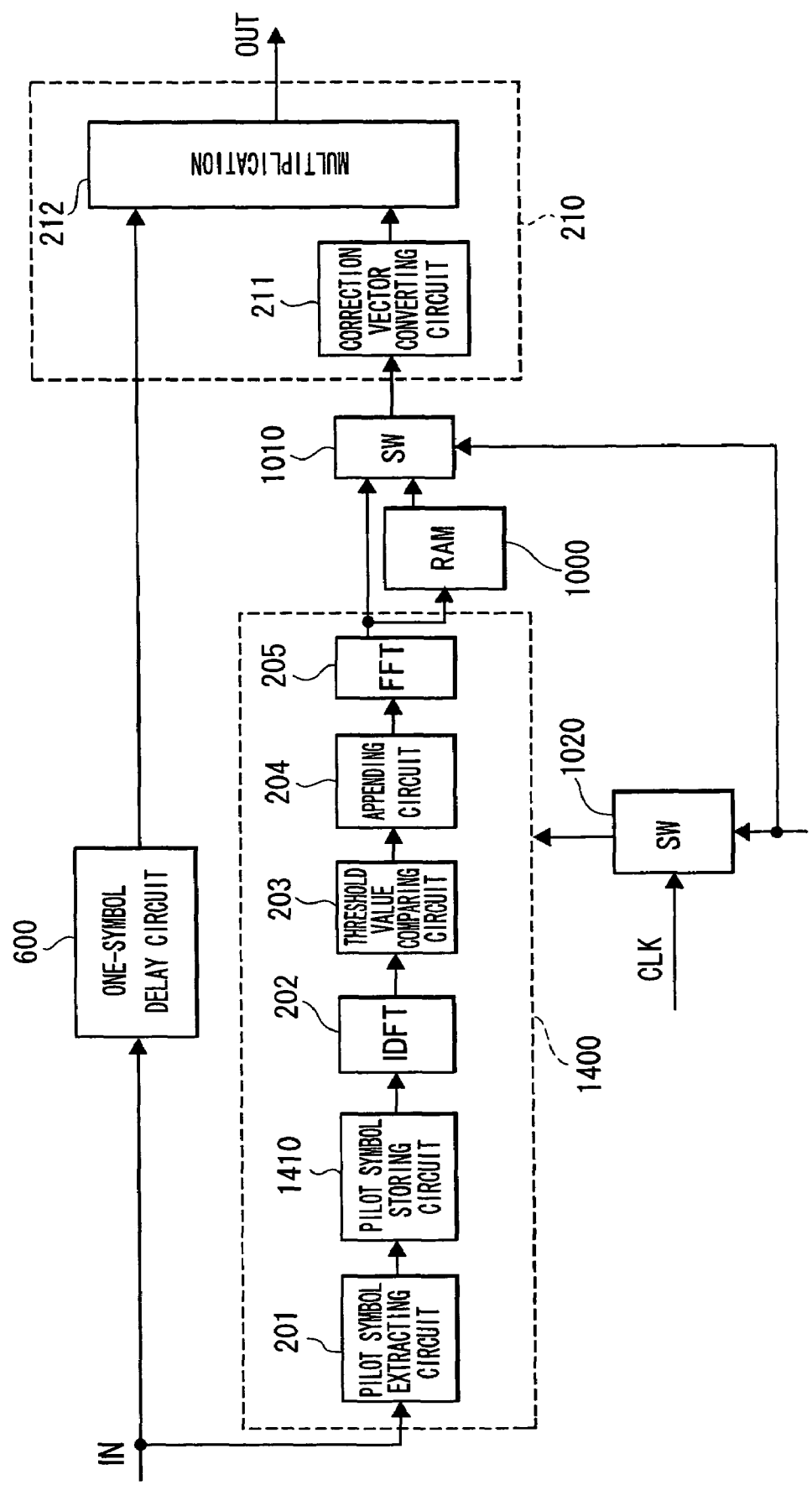
FIG. 15 is a block diagram showing the structure of an equalizer of a twelfth exemplary embodiment.

FIG. 15 is a block diagram showing the structure of the equalizer of the twelfth exemplary embodiment. The equalizer of the twelfth exemplary embodiment includes the one-symbol delay circuit 600, the channel estimating section 1400, the RAM 1000, the switches 1010, 1020, and the equalization computing section 210. Here, description of structures which are the same as those of the previously-described exemplary embodiments will be omitted.

The equalizer and equalization method of the twelfth exemplary embodiment achieve the same effects as the equalizers and equalization methods of the first, sixth, and seventh exemplary embodiments.

Thirteenth Exemplary Embodiment

An equalizer and equalization method of a thirteenth exemplary embodiment will be described by using the drawings. To summarize the equalizer and equalization method of the thirteenth exemplary embodiment by using FIG. 1, by using the pilot symbols of the current (e.g., t3) OFDM symbol and the pilot symbols of the OFDM symbol which is two symbols before (e.g., t1), the equalizer and equalization method of the thirteenth exemplary embodiment demodulate the OFDM symbol which is one symbol before (e.g., t2), in the same way as the equalizer and equalization method of the eleventh exemplary embodiment. Further, by using the pilot symbols of the current (e.g., t5) OFDM symbol, the pilot symbols of the OFDM symbol which is one symbol before (e.g., t4), the pilot symbols of the OFDM symbol which is two symbols before (e.g., t3), and the pilot symbols of the OFDM symbol which is three symbols before (e.g., t2), the equalizer and equalization method of the thirteenth exemplary embodiment demodulate the OFDM symbol which is one symbol before (e.g., t4).

Figure 16:
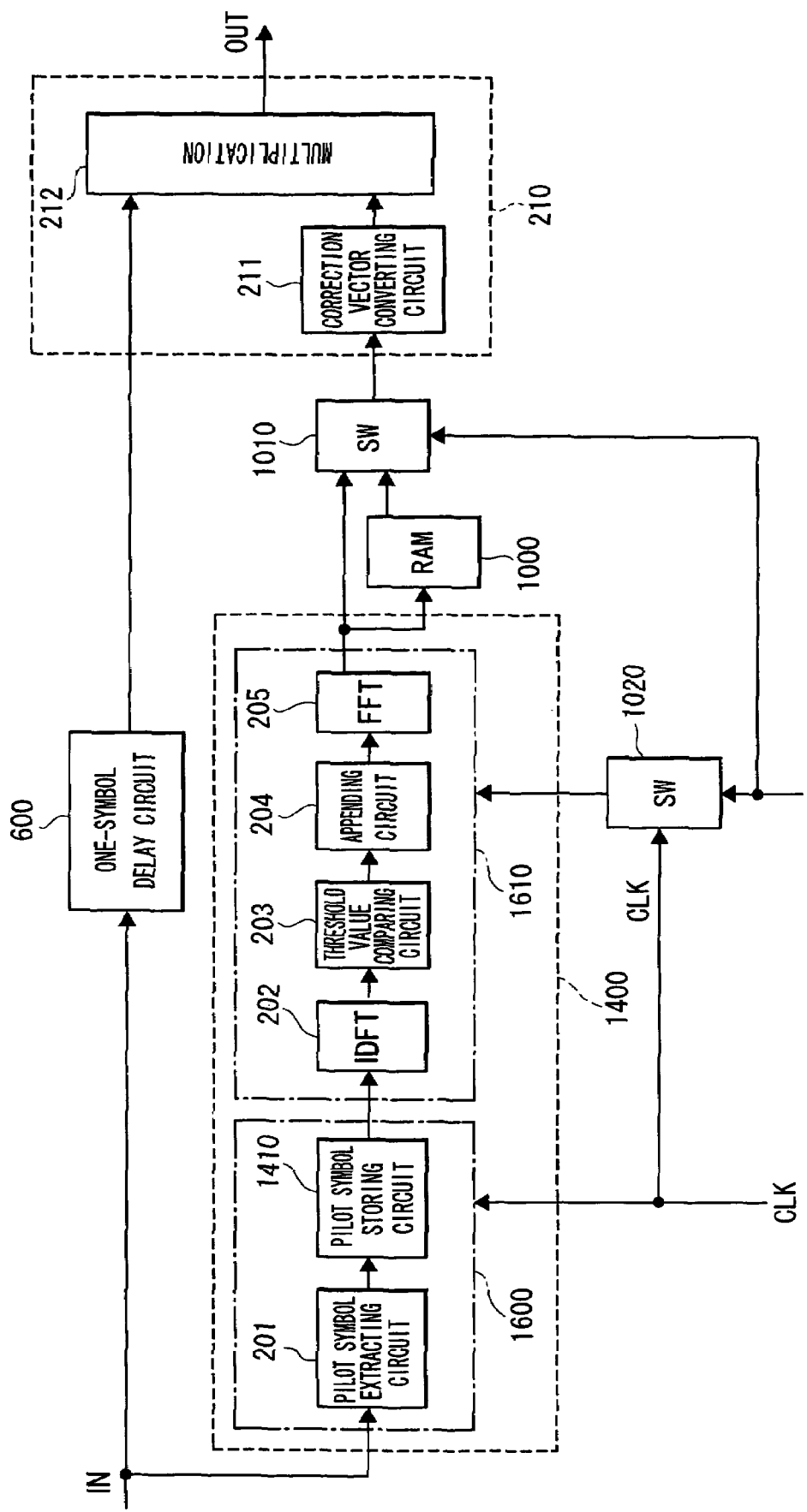
FIG. 16 is a block diagram showing the structure of an equalizer of a thirteenth exemplary embodiment.

FIG. 16 is a block diagram showing the structure of the equalizer of the thirteenth exemplary embodiment. The equalizer of the thirteenth exemplary embodiment includes the one-symbol delay circuit 600, the channel estimating section 1400, the RAM 1000, the switches 1010, 1020, and the equalization computing section 210. Here, description of structures which are the same as those of the previously-described exemplary embodiments will be omitted.

The channel estimating section 1400 is divided into a first area 1600 and a second area 1610. The first area 1600 is structured by the pilot symbol extracting circuit 201 and the pilot symbol storing circuit 1410. The second area 1610 is structured by the inverse discrete Fourier transform circuit 202, the threshold value comparing circuit 203, the appending circuit 204, and the fast Fourier transform circuit 205. The clock signal CLK is supplied to both areas, and the clock signal CLK supplied to the second area 1610 is supplied via the switch 1020 which is controlled by the intermittent operation control signal. Namely, at the time of intermittent operation, the clock signal CLK is not supplied to the second area 1610.

As described above, the equalizer and equalization method of the thirteenth exemplary embodiment achieve the same effects as the equalizer and equalization method of the twelfth exemplary embodiment.

Further, in accordance with the equalizer and equalization method of the thirteenth exemplary embodiment, the computing processing circuits (the inverse discrete Fourier transform circuit 202 and the fast Fourier transform circuit 205) which consume much electric power are gathered together in an area which is controlled by the same clock signal. Accordingly, in accordance with the equalizer and equalization method of the thirteenth exemplary embodiment, the amount of electric power which is consumed can be reduced even more by stopping the circuits which consume the most electric power.

Moreover, in accordance with the equalizer and equalization method of the thirteenth exemplary embodiment, while the second area 1610 is stopped, the first area 1600 operates and can continue to extract and store the pilot symbols. Accordingly, in accordance with the equalizer and equalization method of the thirteenth exemplary embodiment, when the intermittent operation is finished, normal operation can be carried out and the received signal can be processed quickly from immediately after the circuits of the second area 1610 begin operation.

What is claimed is:

1. An equalizer comprising:
  a first extracting circuit extracting a plurality of pilot symbols from an inputted signal;
  an inverse Fourier transform circuit inversely Fourier transforming the extracted plurality of pilot symbols, and computing a complex gain per path;
  a second extracting circuit extracting a plurality of paths by using the complex gains;
  a Fourier transform circuit Fourier transforming the extracted paths;
  an equalization computing circuit extracting phase components of the Fourier-transformed paths, and equalizing the inputted signal by using the extracted phase components;

a one-symbol delay circuit delaying the inputted signal by one symbol;

a storing circuit temporarily storing the Fourier-transformed paths;

a first switching circuit outputting the Fourier-transformed paths or the stored paths, in accordance with a control signal; and a second switching circuit determining, in accordance with the control signal, whether or not a clock signal is to be supplied to the Fourier transform circuit.

2. The equalizer of claim 1, wherein the inverse Fourier transform circuit carries out inverse discrete Fourier transformation or inverse fast Fourier transformation.

3. The equalizer of claim 2, wherein the second extracting circuit includes:

a threshold value comparing circuit determining a maximum electric power amount among electric power amounts per the respective paths, and judging whether or not the electric power amount of each path is within a predetermined electric power amount from the maximum electric power amount; and an appending circuit appending a predetermined number of zeros to an output of the threshold value comparing circuit, and outputting the appended output value.

4. The equalizer of claim 1, wherein the second extracting circuit includes:

a threshold value comparing circuit determining a maximum value among values in which are added absolute values of a real number and an imaginary number of a complex gain per the respective paths, and judging whether or not the absolute value of each path is within a predetermined range from the maximum value; and an appending circuit appending a predetermined number of zeros to an output of the threshold value comparing circuit, and outputting the appended output value.

5. The equalizer of claim 2, wherein the equalization computing circuit extracts the phase component and an amplitude of the Fourier-transformed path, and carries out multiplication by using the extracted phase component and amplitude and the inputted signal.

6. An equalizer comprising:

a one-symbol delay circuit delaying an inputted signal by one symbol;

a first extracting circuit extracting a plurality of pilot symbols from the inputted signal;

an inverse Fourier transform circuit inversely Fourier transforming the extracted plurality of pilot symbols, and computing a complex gain per path;

a two-symbol delay circuit delaying the complex gains by two symbols;

an addition circuit adding the complex gains and the complex gains which are delayed by two symbols;

a second extracting circuit extracting a plurality of paths by using the added complex gains;

a Fourier transform circuit Fourier transforming the extracted paths; and an equalization computing circuit extracting phase components of the Fourier-transformed paths, and, by using the extracted phase components, equalizing the inputted signal which is delayed by one symbol.

7. The equalizer of claim 6, further comprising:

a storing circuit temporarily storing the Fourier-transformed paths;

a first switching circuit outputting the Fourier-transformed paths or the stored paths, in accordance with a control signal; and a second switching circuit determining, in accordance with the control signal, whether or not a clock signal is to be supplied to the Fourier transform circuit.

8. An equalizer comprising:

a one-symbol delay circuit delaying an inputted signal by one symbol;

a first extracting circuit extracting a plurality of pilot symbols from the inputted signal;

a two-symbol delay circuit delaying the extracted pilot symbols by two symbols;

an arraying circuit combining the extracted pilot symbols and the delayed pilot symbols, and outputting combined pilot symbols;

an inverse Fourier transform circuit inversely Fourier transforming the combined pilot symbols, and computing a complex gain per path;

a second extracting circuit extracting a plurality of paths by using the complex gains;

a Fourier transform circuit Fourier transforming the extracted paths; and an equalization computing circuit extracting phase components of the Fourier-transformed paths, and, by using the extracted phase components, equalizing the inputted signal which is delayed by one symbol.

9. An equalizer comprising:

a first one-symbol delay circuit delaying an inputted signal by one symbol;

a first extracting circuit extracting a plurality of pilot symbols from the inputted signal;

an inverse Fourier transform circuit inversely Fourier transforming the extracted plurality of pilot symbols, and computing a complex gain per path;

a second one-symbol delay circuit delaying the complex gains by one symbol;

a two-symbol delay circuit delaying the complex gains by two symbols;

a three-symbol delay circuit delaying the complex gains by three symbols;

an addition circuit adding the complex gains, the complex gains which are delayed by one symbol, the complex gains which are delayed by two symbols, and the complex gains which are delayed by three symbols;

a second extracting circuit extracting a plurality of paths by using the added complex gains;

a Fourier transform circuit Fourier transforming the extracted paths; and an equalization computing circuit extracting phase components of the Fourier-transformed paths, and, by using the extracted phase components, equalizing the inputted signal which is delayed by one symbol.

10. The equalizer of claim 9, further comprising:

a storing circuit temporarily storing the Fourier-transformed paths;

a first switching circuit outputting the Fourier-transformed paths or the stored paths, in accordance with a control signal; and a second switching circuit determining, in accordance with the control signal, whether or not a clock signal is to be supplied to the Fourier transform circuit.

11. An equalizer comprising:

a first one-symbol delay circuit delaying an inputted signal by one symbol;

a first extracting circuit extracting a plurality of pilot symbols from the inputted signal;

an inverse Fourier transform circuit inversely Fourier transforming the extracted plurality of pilot symbols, and computing a complex gain per path;

a second one-symbol delay circuit delaying the complex gains by one symbol;
a second extracting circuit extracting a plurality of paths by using the delayed complex gains;
a Fourier transform circuit Fourier transforming the extracted paths;
a storing circuit temporarily storing the Fourier-transformed paths;
a first switching circuit outputting the Fourier-transformed paths or the stored paths, in accordance with a control signal;
a second switching circuit determining, in accordance with the control signal, whether or not a clock signal is to be supplied to the Fourier transform circuit; and
an equalization computing circuit extracting a phase component of a selected path, and, by using the extracted phase component, equalizing the inputted signal which is delayed by one symbol.

12. An equalizer comprising:
a first one-symbol delay circuit delaying an inputted signal by one symbol;
a first extracting circuit extracting a plurality of pilot symbols from the inputted signal;
a first storing circuit storing the extracted plurality of pilot symbols in units of each symbol;
an inverse Fourier transform circuit inversely Fourier transforming the stored plurality of pilot symbols, and computing a complex gain per path;
a second one-symbol delay circuit delaying the complex gains by one symbol;
a second extracting circuit extracting a plurality of paths by using the delayed complex gains;
a Fourier transform circuit Fourier transforming the extracted paths; and
an equalization computing circuit extracting phase components of the paths, and, by using the extracted phase components, equalizing the inputted signal which is delayed by one symbol.

13. The equalizer of claim 12, further comprising:
a second storing circuit temporarily storing the Fourier-transformed paths;
a first switching circuit outputting the Fourier-transformed paths or the stored paths, in accordance with a control signal; and
a second switching circuit determining, in accordance with the control signal, whether or not a clock signal is to be supplied to the Fourier transform circuit.

* * * * *